United States Patent
Hudson

(10) Patent No.: US 11,221,740 B2
(45) Date of Patent: Jan. 11, 2022

(54) SYSTEMS AND METHODS FOR 3D SCRIPTING LANGUAGE FOR MANIPULATION OF EXISTING 3D MODEL DATA

(71) Applicant: Shapeways, Inc., New York, NY (US)

(72) Inventor: Alan D. Hudson, New York, NY (US)

(73) Assignee: Shapeways, Inc., New York, NY (US)

( * ) Notice: Subject to any disclaimer, the term of this patent is extended or adjusted under 35 U.S.C. 154(b) by 391 days.

(21) Appl. No.: 15/919,092

(22) Filed: Mar. 12, 2018

(65) Prior Publication Data
US 2018/0261037 A1 Sep. 13, 2018

Related U.S. Application Data

(60) Provisional application No. 62/470,117, filed on Mar. 10, 2017.

(51) Int. Cl.
| | |
|---|---|
| *G06F 3/0484* | (2013.01) |
| *B33Y 50/02* | (2015.01) |
| *G06F 9/451* | (2018.01) |
| *B29C 64/393* | (2017.01) |
| *G06F 16/28* | (2019.01) |

(Continued)

(52) U.S. Cl.
CPC ............ *G06F 3/0484* (2013.01); *B29C 64/00* (2017.08); *B29C 64/393* (2017.08); *B33Y 50/00* (2014.12); *B33Y 50/02* (2014.12); *G06F 3/04845* (2013.01); *G06F 8/34* (2013.01); *G06F 9/451* (2018.02); *G06F 9/453* (2018.02); *G06F 16/289* (2019.01); *G06F 21/608* (2013.01); *G06F 30/00* (2020.01); *G06Q 20/18* (2013.01); *G07F 17/26* (2013.01); *G07F 17/266* (2013.01); *B41J 2/17566* (2013.01); *G06F 3/03545* (2013.01); *G06F 3/04815* (2013.01); *G06F 21/10* (2013.01); *G06Q 30/02* (2013.01)

(58) Field of Classification Search
CPC ....... G06F 3/0484; B33Y 50/00; B33Y 50/02; B29C 64/393; B29C 64/00
See application file for complete search history.

(56) References Cited

U.S. PATENT DOCUMENTS

| | | |
|---|---|---|
| 6,552,721 B1 | 4/2003 | Ishikawa |
| 10,754,515 B2 | 8/2020 | Hudson |

(Continued)

*Primary Examiner* — Sarah Lhymn
(74) *Attorney, Agent, or Firm* — Wolf, Greenfield & Sacks, P.C.

(57) ABSTRACT

As three-dimensional (3D) printing and additive manufacturing becomes a way for individuals and companies to distribute physical goods, there is a growing need for creators of physical goods to enable customers to customize 3D printed objects while protecting core electronic assets in the form of the files used to define and print the objects. Server-side rendering of 3D object images provides an opportunity to protect 3D object files while offering performance advantages. A scripting language may be central to delivering a seamless user experience interacting with 3D object models on client devices. Object creators and vendors may rely on the scripting language to create user interfaces for selling customizable objects. And once the user interface is developed, it may provide the basis for users accessing, viewing, manipulating, selecting materials, rendering, pricing, and printing a range of 3D objects.

22 Claims, 15 Drawing Sheets

(51) Int. Cl.
  *B33Y 50/00* (2015.01)
  *G07F 17/26* (2006.01)
  *G06Q 20/18* (2012.01)
  *G06F 30/00* (2020.01)
  *B29C 64/00* (2017.01)
  *G06F 8/34* (2018.01)
  *G06F 21/60* (2013.01)
  *G06F 3/0481* (2013.01)
  *G06F 3/0354* (2013.01)
  *B41J 2/175* (2006.01)
  *G06F 21/10* (2013.01)
  *G06Q 30/02* (2012.01)

(56) References Cited

U.S. PATENT DOCUMENTS

| | | |
|---|---|---|
| 2003/0103089 A1 | 6/2003 | Ramani et al. |
| 2007/0196030 A1 * | 8/2007 | Grimaud ............ G06T 17/00 382/276 |
| 2007/0296203 A1 | 12/2007 | Golan |
| 2008/0082549 A1 | 4/2008 | Baker et al. |
| 2008/0127052 A1 | 5/2008 | Rostoker |
| 2010/0306344 A1 | 12/2010 | Athas et al. |
| 2011/0313878 A1 | 12/2011 | Norman |
| 2012/0128234 A1 | 5/2012 | Kao et al. |
| 2012/0287472 A1 | 11/2012 | Pettis |
| 2013/0036401 A1 | 2/2013 | Lininger |
| 2013/0125029 A1 | 5/2013 | Miller et al. |
| 2014/0074272 A1 | 3/2014 | Cowden, IV |
| 2014/0288699 A1 | 9/2014 | Williams et al. |
| 2016/0180379 A1 | 6/2016 | Salmon et al. |
| 2016/0246899 A1 | 8/2016 | Hirschtick et al. |
| 2017/0091476 A1 | 3/2017 | Basheer et al. |
| 2017/0186064 A1 | 6/2017 | Kaptsan et al. |
| 2018/0032304 A1 | 2/2018 | Lin et al. |
| 2018/0260088 A1 | 9/2018 | Hudson |
| 2018/0260089 A1 | 9/2018 | Hudson |
| 2018/0260575 A1 | 9/2018 | Hudson |
| 2019/0102815 A1 | 4/2019 | Norman |

* cited by examiner

SYSTEMS AND METHODS FOR 3D SCRIPTING LANGUAGE FOR MANIPULATION OF EXISTING 3D MODEL DATA

RELATED APPLICATIONS

This application claims the benefit under 35 U.S.C. § 119(e) of U.S. Provisional Patent Application Ser. No. 62/470,117, filed on Mar. 10, 2017, titled "3D SCRIPTING LANGUAGE FOR MANIPULATION OF EXISTING 3D MODEL DATA," the disclosure, including appendices, of which is hereby incorporated by reference in its entirety.

BACKGROUND OF INVENTION

1. Field of Invention

The present disclosure relates generally to additive manufacturing and three-dimensional printing.

2. Discussion of Related Art

Three-dimensional (3D) printing technology has captured the imagination of a broad range of people. Widespread availability of low-cost desktop printers has driven business, consumer, and hobbyist interest in what is broadly known as additive manufacturing.

Despite an increasingly broad appeal, 3D printing still relies on the complex skills associated with solid modeling. In the traditional approach, an individual installs solid modeling software on his or her computer, learns how to use it, and creates computer representations of three-dimensional objects. Individual solid modelers then share their creations, in the form of 3D object files, on internet web sites.

SUMMARY OF INVENTION

The inventors have recognized that additive manufacturing can be both a form of production and distribution. Individuals, small businesses, and even large companies in the business of selling physical goods may offer products for sale by allowing customers to purchase these products through 3D printing. For example, it is appreciated that it would be beneficial for a shop owner may wish to sell an object, such as a piece of jewelry, while allowing a customer the ability to choose materials (e.g., silver or gold) and to perform some degree of customization such as inscription, monogram or sizing. In this case, it may be useful for a shop owner to not share the underlying 3D object file and instead place limitations on a customer's ability to download the 3D object file and may also further limit production to a 3D printing service bureau. Also, for a variety of reasons, the shop owner may not wish to allow any and all forms of customization to an object. Yet, the shop owner may desire to make some modifications permitted through one or more publicly-facing interfaces that can be accessible by a user (e.g., a consumer of their products).

Historically, once an individual has created a computer representation of a three-dimensional object, sharing the entire 3D object file has been the only way to distribute the object to other people. However, in giving the electronic file to other people, the individual loses control over how the object may be manipulated and when and how the object may be produced. Effectively, the individual is giving away all rights in the underlying object, and this is problematic for individuals and businesses that make money selling physical goods. By sharing the underlying electronic file, solid modelers enable other individuals to download and to modify the file for subsequent 3D printing without restriction. It is appreciated that this traditional approach has limited the ability of individuals and businesses to sell 3D printed objects and to allow some customization of the object without sharing the underlying 3D object file.

The inventors have also recognized that several skill sets are involved in developing an interface to provide customers with access to 3D printable objects. First, creating and/or modifying a 3D printable object requires skills in solid modeling and 3D programming. Second, presenting an interface to a customer requires expertise in front end user experience development. Third, offering services in a web application environment necessitates server development skills. Further, printing of 3D models generally requires additional skills in reviewing models and successfully printing them in a variety of materials. The inventors have recognized further that many object designers and potential shop owners generally do not possess all three of these skill sets to adequately produce 3D models.

A method and system is described herein for providing object designers and shop owners with a way to sell custom products that are based upon 3D printable objects in a more efficient and user-friendly manner. The inventors have recognized that some embodiments may include various components of a system including aspects related to systems and functions operated by a shop owner, a user, and a 3D object manipulation platform.

According to an embodiment, a shop owner creates a 3D printable object that can be produced and sold in an online environment. The 3D printable object may be modeled in the form of a script and one or more parameters. The shop owner may then access an integrated development environment (IDE) to create a graphical user interface (UI) for presenting the 3D printable object to a customer. The IDE may include a variety of controls to enable the shop owner to establish initial parameter values, define parameter ranges, define material choices for the customer, define whether to allow customers to download an electronic file, establish a location for UI hosting, check the 3D printability of the object, define printing options, establish pricing and markup policies, save the object, save the UI, among other functions relating to production of a customized object. Once the shop owner has defined the UI within the IDE, the shop owner can then save the UI and either host the UI on the shop owner's website or publish the UI through a third-party service provider. The shop owner may, for example, host a website as well as a 3D object manipulation platform. Alternatively, in some embodiments, the shop owner may purchase a 3D object manipulation service that may include UI hosting.

According to an embodiment, with one or more 3D printable objects available on a shop owner's website, a customer may visit the website and select an object. The object may be a predefined object that can be customized, and may be presented as part of a list of customizable 3D objects. In some embodiments, when the user selects an object, the UI associated with the object may then be presented to the customer. The UI may include a viewer to see the object as the object is manipulated and controls for modifying parameters, materials, print options and the like. The customer may then, according to the permissions defined by the shop owner, modify or customize the object, select a material for rendering, view pricing information, view printing options and ultimately purchase the printed object. The shop owner may allow the customer to download a file (e.g., STL, X3D formats) representing the object as modified, enabling the customer to print the modified object on a local 3D printer. In some embodiments, the customer may pay for the option to download the file. In other embodiments, the shop owner may earn money in a markup of the cost of printing the object at a 3D printing service bureau such as with the services provided by Shapeways, Inc. (www.shapeways.com).

A 3D object manipulation platform (hereinafter "3D platform") is a common element to many embodiments of the present invention. The 3D platform performs tasks in response to application program interface (API) endpoints as defined by uniform resource identifier (URI) addresses. Two types of users interact with the 3D platform. The shop owner, and parties acting on behalf of the shop owner, interact with the IDE to access 3D platform features to generate the UI. The shop owner may also rely on the 3D platform to host the UI, for example, by providing a dedicated uniform resource locator (URL) accessible by the shop owner web page. When the shop owner's website presents a web page to a customer, that web page may call a URL from the 3D platform in order to load the UI discussed above.

Other aspects of the 3D platform are accessible by the customer or user through the client software accessing the UI. In some embodiments, the UI is viewable within the customer's web browser client. The client calls API endpoints according to program logic loaded alongside the UI. For example, the client may establish a "sceneID" which represents a hash of the script representing the 3D printable object plus a unique token for the session.

The "sceneID" may be, according to one embodiment, used thereafter to identify the specific 3D printable object as associated with the customer. The client may pass a sceneID identifier to an API endpoint when seeking images or other data cached within the 3D platform. In some embodiments, the client software maintains application state by storing relevant parameters and other values in order to call API endpoints. As is discussed herein, the client's program logic generally requests cached information from the API endpoints before passing a script identifier (e.g., "sceneID" or "jobID") and parameters to a back-end server within the 3D platform.

According to another aspect, a scripting language is provided that is capable of performing 3D manipulations of an object file. In one implementation, model files that use a voxel-based representation are used to model a 3D object, which can ensure that a particular object can be printed. A scripting command set is provided that performs a number of types of transformations to a voxel-based object including, but not limited to 3D linear transformations, rotations, zooming, panning, reflections, and scaling, among others. Also, the system may be capable of rendering (e.g., within the interface to a user) a model in one or more materials, in real time. Further, according to one implementation, the system may be capable of performing nonlinear transformations and composite transformations including more than one simple transformation. To this end, a scripting engine may be provided that receives a model definition, and a series of script information, and renders a user interface in real time. The engine may be capable of rendering the model in different materials within the interface, may include a pricing component that determines the price of printing the object based on the material selected, and any user modifications. The engine may also include a component that tests a modified object to determine whether the object is printable in a selected material. The engine may also be adapted to receive, from a calling function, a script object having a parameter value, creating the object, defining physical bounds of the object and other properties, and rendering the object within a scene that can be displayed to the user.

Another aspect relates to a custom script editor, which allows users to load, save, edit, and otherwise manage custom scripts. The system may also include a number of templates for custom UIs that may be used to view, edit, and order customized 3D objects by users. The UIs may also include tools that are used for checking, ordering, and otherwise managing the production of custom 3D objects. Such UIs may, for example, downloaded from an ecommerce site for the purpose of modifying and customizing 3D objects from an online library of 3D objects. Further, it is appreciated that the scripting language may be used to define a 3D object as a series of manipulations which can be stored and recalled, and in one implementation, a script defines a number of parameters of a Javascript object.

Another aspect is directed to a computer implemented method that comprises providing, by a first server, to a user interacting with the display of a client computer in a distributed computer system, a presentation interface including a display interface configured to display an image relating to a computer representation of a three-dimensional object and a control interface configured to accept inputs capable of modifying parameters associated with the three-dimensional object. The computer representation of the three-dimensional object comprises at least one script and a set of parameters. The computer representation of the three-dimensional object is not provided to the user. The method further comprises receiving at the first server, from the user interacting with the presentation interface, a request for the image relating to the computer representation of the three-dimensional object. The request includes an object identifier and at least one or more user inputs from the group comprising parameter values, attributes, uniform resource identifiers, cache busting markers, material identifiers, and three-dimensional ray values. The object identifier and the at least one or more user inputs are applied to the computer representation of the three-dimensional object. The method further comprises requesting, from a second server in a distributed computer system, the image relating to the computer representation of the three-dimensional object. The image is generated based on the computer representation of the three-dimensional object. The method further comprises receiving the image from the second server and displaying, by the first server, the image within the presentation interface.

In some embodiments, the computer representation of the three-dimensional object further comprises an electronic file, the electronic file being different from the image.

In some embodiments, the image comprises a rasterized two-dimensional file.

In some embodiments, the image comprises a static three-dimensional file.

In some embodiments, the method further comprises receiving, at the first server, from the user interacting with the control interface, instructions to modify one or more parameters associated with the computer representation of the three-dimensional object. The method further comprises requesting, from the second server, responsive to the user instructions, an updated image relating to the computer representation of the three-dimensional object. The updated image reflects the modified computer representation of the three-dimensional object responsive to the modified one or more parameters. The method further comprises receiving, from the second server, the updated image and displaying, by the first server, the image within the presentation interface.

In some embodiments, the method further comprises receiving, at the first server, from the user interacting with the control interface, instructions to modify one or more parameters associated with the computer representation of the three-dimensional object. The method further comprises identifying on the first server, an updated image relating to the computer representation of the three-dimensional object. The updated image reflects the modified computer representation of the three-dimensional object responsive to the modified one or more parameters. The method further comprises displaying, by the first server, the updated image within the presentation interface.

In some embodiments, the method further comprises receiving, from the user, a request to render the computer representation of the three-dimensional object in a specific material. The method further comprises requesting, from the second server, an image representing the rendering of the three-dimensional object in the material. The method further comprises receiving, from the second server, the image relating to the three-dimensional object rendered in the material. The method further comprises displaying the image to the user in the presentation interface.

In some embodiments, the method further comprises receiving, from the user, a request to download a file containing an electronic representation of the three-dimensional object. The method further comprises generating the file from the script and user-selected parameters. The file is a single computer file that is distinct from the script and the parameters. The method further comprises presenting the file to the user.

In some embodiments, the method further comprises the file includes an electronic file format selected from the group comprising STL and X3D.

In some embodiments, the method further comprises calculating a price for printing the three-dimensional object in the material and presenting the price to the user.

In some embodiments, the method further comprises selecting one or more printers for the three-dimensional object, presenting the one or more printers to the user, receiving an input from the user selecting a printer from the one or more printers, generating a file containing an electronic representation of the three-dimensional object, and sending the file to the printer.

Another aspect is directed to a distributed computer system comprising a first server, a second server, and a client component. The system is configured to provide by a first server, to a user interacting with the display of a client computer in a distributed computer system, a presentation interface including a display interface configured to display an image relating to a computer representation of a three-dimensional object and a control interface configured to accept inputs capable of modifying parameters associated with the three-dimensional object. The computer representation of the three-dimensional object comprises at least one script and a set of parameters. The computer representation of the three-dimensional object is not provided to the user. The system is further configured to receive at the first server, from the user interacting with the presentation interface, a request for the image relating to the computer representation of the three-dimensional object. The request includes an object identifier and at least one or more user inputs from the group comprising parameter values, attributes, uniform resource identifiers, cache busting markers, material identifiers, and three-dimensional ray values. The object identifier and the at least one or more user inputs are applied to the computer representation of the three-dimensional object. The system is further configured to request, from a second server in a distributed computer system, the image relating to the computer representation of the three-dimensional object. The image is generated based on the computer representation of the three-dimensional object. The system is further configured to receive the image from the second server and display, by the first server, the image within the presentation interface.

In some embodiments, the computer representation of the three-dimensional object comprises an electronic file, the electronic file being different from the image.

In some embodiments, the image comprises a rasterized two-dimensional file.

In some embodiments, the image comprises a static three-dimensional file.

In some embodiments, the system is further configured to receive, at the first server, from the user interacting with the control interface, instructions to modify one or more parameters associated with the computer representation of the three-dimensional object.

The system is further configured to request, from the second server, responsive to the user instructions, an updated image relating to the computer representation of the three-dimensional object. The updated image reflects the modified computer representation of the three-dimensional object responsive to the modified one or more parameters. The system is further configured to receive, from the second server, the updated image and display, by the first server, within the presentation interface, the image.

In some embodiments, the system is further configured to receive, at the first server, from the user interacting with the control interface, instructions to modify one or more parameters associated with the computer representation of the three-dimensional object. The system is further configured to identify on the first server, an updated image relating to the computer representation of the three-dimensional object. The updated image reflects the modified computer representation of the three-dimensional object responsive to the modified one or more parameters. The system is further configured to display, by the first server, the updated image within the presentation interface.

In some embodiments, the system is further configured to receive, from the user, a request to render the computer representation of the three-dimensional object in a specific material. The system is further configured to request, from the second server, an image representing the rendering of the three-dimensional object in the material. The system is further configured to compute, by the second server, an appropriate geometry for constructing the three-dimensional object from the material. The system is further configured to render, by the second server, the image representing the rendering of the three dimensional object in the material. The system is further configured to display the image to the user in the presentation interface.

In some embodiments, the system is further configured to receive, from the user, a request to download a file containing an electronic representation of the three-dimensional object. The system is further configured to generate the file from the script and user-selected parameters. The file is a single computer file that is distinct from the script and the parameter. The system is further configured to present the file to the user.

In some embodiments, the file includes an electronic file format selected from the group comprising STL and X3D.

In some embodiments, the system is further configured to calculate a price for printing the three-dimensional object in the material and present the price to the user.

In some embodiments, the system is further configured to select one or more printers for the three dimensional object, present the one or more printers to the user, receive an input from the user selecting a printer from the one or more printers, generate a file containing an electronic representation of the three-dimensional object, and send the file to the printer.

Another aspect is directed to a computer implemented method that comprises displaying, to a user interacting with the display of a client computer, a presentation interface including a display interface configured to display an image relating to a computer representation of a three-dimensional object and a control interface configured to accept inputs capable of modifying parameters associated with the three-dimensional object. The computer representation of the three-dimensional object comprises at least one script and a set of parameters. The method further comprises accepting from a user a request for the image relating to a computer representation of a three-dimensional object. The request includes an object identifier and at least one or more of the group comprising parameter values, attributes, uniform resource identifiers, cache busting markers, material identifiers, and three-dimensional ray values. The method further comprises transmitting the request to a server, receiving the image from the server and displaying the image to the user.

In some embodiments, the computer representation of a three-dimensional object comprises an electronic file, the electronic file being different from the image.

In some embodiments, the image comprises a rasterized two-dimensional file.

In some embodiments, the image comprises a static three-dimensional file.

In some embodiments, the method further comprises accepting from the user interacting with the control interface, instructions to modify one or more parameters associated with the computer representation of the three-dimensional object. The method further comprises requesting, from the server, responsive to the user instructions, an updated image relating to the computer representation of the three-dimensional object. The updated image reflects the modified computer representation of the three-dimensional object responsive to the modified one or more parameters. The method further comprises receiving, from the server, the updated image and displaying to the user the image within the presentation interface.

In some embodiments, the method further comprises accepting from the user interacting with the control interface, instructions to modify one or more parameters associated with the computer representation of the three-dimensional object. The method further comprises requesting, from the server, responsive to the user instructions, a cached image relating to the computer representation of the three-dimensional object. The cached image reflects the modified computer representation of the three-dimensional object responsive to the modified one or more parameters. The method further comprises receiving, from the server, the cached image and displaying to the user the image within the presentation interface.

In some embodiments, the method further comprises accepting from the user interacting with the control interface, instructions to modify one or more parameters associated with the computer representation of the three-dimensional object. The method further comprises requesting, from the server, responsive to the user instructions, a cached image relating to the computer representation of the three-dimensional object. The cached image reflects the modified computer representation of the three-dimensional object responsive to the modified one or more parameters. The method further comprises receiving, from the server, a message indicating that the cached image could not be found. The method further comprises requesting, from the server, responsive to the user instructions, an updated image relating to the computer representation of the three-dimensional object. The updated image reflects the modified computer representation of the three-dimensional object responsive to the modified one or more parameters. The method further comprises receiving, from the server, the updated image and displaying to the user the image within the presentation interface.

In some embodiments, the method further comprises receiving from the user a request to render the computer representation of the three-dimensional object in a specific material, requesting from the server an image representing the rendering of the three-dimensional object in the material, receiving the image from the server, and displaying the image to the user.

In some embodiments, the method further comprises receiving from the user a request to download a file containing an electronic representation of the three-dimensional object, requesting the file from the server, receiving the file from the server, and presenting the file to the user.

In some embodiments, the method further comprises receiving from the server a price for printing the three-dimensional object in the material and displaying the price to the user.

In some embodiments, the method further comprises receiving a request from the user to print the three-dimensional object with a printer, transmitting the request to a server, receiving a confirmation of the print request, and displaying the confirmation to the user.

In some embodiments, the method further comprises obtaining an identification of the user, obtaining an identification of the computer representation of the three-dimensional object, and generating a scene identification responsive to the user identification and the identification of the computer representation of the three-dimensional object.

Another aspect is directed to a computer system configured to display, to a user interacting with the display of a client computer, a presentation interface including a display interface configured to display an image relating to a computer representation of a three-dimensional object and a control interface configured to accept inputs capable of modifying parameters associated with the three-dimensional object. The computer representation of the three-dimensional object comprises at least one script and a set of parameters. The system is further configured to accept from a user a request for the image relating to a computer representation of a three-dimensional object. The request includes an object identifier and at least one or more of the group comprising parameter values, attributes, uniform resource identifiers, cache busting markers, material identifiers, and three-dimensional ray values. The system is further configured to transmit the request to a server, receive the image from the server, and display the image to the user.

In some embodiments, the computer representation of a three-dimensional object comprises an electronic file, the electronic file being different from the image.

In some embodiments, the image comprises a rasterized two-dimensional file.

In some embodiments, the image comprises a static three-dimensional file.

In some embodiments, the system is further configured to accept from the user interacting with the control interface, instructions to modify one or more parameters associated with the computer representation of the three-dimensional object. The system is further configured to request, from the server, responsive to the user instructions, an updated image relating to the computer representation of the three-dimensional object. The updated image reflects the modified computer representation of the three-dimensional object responsive to the modified one or more parameters. The system is further configured to receive, from the server, the updated image and display to the user the image within the presentation interface.

In some embodiments, the system is further configured to accept from the user interacting with the control interface, instructions to modify one or more parameters associated with the computer representation of the three-dimensional object. The system is further configured to request, from the server, responsive to the user instructions, a cached image relating to the computer representation of the three-dimensional object. The cached image reflects the modified computer representation of the three-dimensional object responsive to the modified one or more parameters. The system is further configured to receive, from the server, the cached image and display to the user the image within the presentation interface.

In some embodiments, the system is further configured to accept from the user interacting with the control interface, instructions to modify one or more parameters associated with the computer representation of the three-dimensional object. The system is further configured to request, from the server, responsive to the user instructions, a cached image relating to the computer representation of the three-dimensional object. The cached image reflects the modified computer representation of the three-dimensional object responsive to the modified one or more parameters. The system is further configured to receive, from the server, a message indicating that the cached image could not be found. The system is further configured to request, from the server, responsive to the user instructions, an updated image relating to the computer representation of the three-dimensional object. The updated image reflects the modified computer representation of the three-dimensional object responsive to the modified one or more parameters. The system is further configured to receive, from the server, the updated image and display to the user the image within the presentation interface.

In some embodiments, the system is further configured to receive from the user a request to render the computer representation of the three-dimensional object in a specific material, request from the server an image representing the rendering of the three-dimensional object in the material, receive the image from the server, and display the image to the user.

In some embodiments, the system is further configured to receive from the user a request to download a file containing an electronic representation of the three-dimensional object, request the file from the server, receive the file from the server, and present the file to the user.

In some embodiments, the system is further configured to receive from the server a price for printing the three-dimensional object in the material and display the price to the user.

In some embodiments, the system is further configured to receive a request from the user to print the three-dimensional object with a printer, transmit the request to a server, receive a confirmation of the print request, and display the confirmation to the user.

In some embodiments, the system is further configured to obtain an identification of the user, obtain an identification of the computer representation of the three-dimensional object, and generate a scene identification responsive to the user identification and the identification of the computer representation of the three-dimensional object.

Another aspect is directed to a computer implemented method that comprises displaying to a user interacting with the display of a client computer in a distributed computer system, a first presentation interface including a first display interface and a first control interface. The first display interface is configured to display an image relating to a computer representation of a three-dimensional object. The computer representation of the three-dimensional object comprises at least one script and a set of parameter values. The first control interface is configured to accept at least one or more first inputs comprising the group of scripts, parameter ranges, initial parameter values, material selections, and object identifiers. The method further comprises receiving at a server, from the user interacting with the presentation interface, the one or more first inputs. The method further comprises generating, by the server, an image relating to the computer representation of the three-dimensional object responsive to the one or more first inputs. The method further comprises displaying, by the server, the image within the first presentation interface. The method further comprises receiving, from the user, a request to generate a second presentation interface including a second display interface configured to display an image relating to a computer representation of the three-dimensional object and a second control interface configured to accept at least one or more second inputs capable of modifying parameters associated with the three-dimensional object. The method further comprises generating, by the server, the second presentation interface and displaying, by the server, the second presentation interface.

In some embodiments, the method further comprises displaying, by the server, the second presentation interface to the user.

In some embodiments, the method further comprises displaying, by the server, the second presentation interface to a third-party user.

In some embodiments, the first control interface is further configured to accept an input requesting a check of the three-dimensional printability of a computer representation of a three-dimensional object. The method further comprises accepting an input requesting the check of the three-dimensional printability of the object, calculating, by the server, a series of checks associated with the three-dimensional printability of the object, and displaying, by the server, to the user a report enumerating the series of checks.

In some embodiments, the first input includes a material selection, the first control interface is further configured to accept an input requesting a check of the three-dimensional printability of a computer representation of a three-dimensional object. The method further comprises accepting an input requesting the check of the three-dimensional printability of the object in the material selected, calculating, by the server, a series of checks associated with the three-dimensional printability of the object in the material, and displaying, by the server, to the user a report enumerating the series of checks.

In some embodiments, the request further comprises at least one or more inputs comprising the group of user interface location, object reset, object material selections, object printing choices, object pricing, and object markup. The method further comprises displaying, responsive to the request, the second presentation interface.

In some embodiments, the second control interface is further configured to accept at least one or more second inputs comprising the group of object material selections, object printing choices, object pricing request, and object purchase request. The method further comprises receiving at a server, from the user interacting with the second control interface, the one or more second inputs, generating, by the server, an image relating to the object responsive to the one or more second inputs, and displaying, by the server, the image within the second presentation interface.

Another aspect is directed to a computer implemented method that comprises providing to a user interacting with the display of a client computer a first presentation interface including a first display interface and a first control interface. The first display interface is configured to display an image relating to a computer representation of a three-dimensional object. The computer representation of the three-dimensional object comprises at least one script and a set of parameter values. The first control interface is configured to accept at least one or more inputs comprising the group of scripts, parameter ranges, initial parameter values, material selection, and object identifiers. The method further comprises accepting the one or more inputs from the user interacting with the presentation interface. The method further comprises transmitting the one or more inputs to a server. The method further comprises receiving, from the server, the image relating to a computer representation of the three-dimensional object responsive to the one or more inputs. The method further comprises displaying the image to the user in the first presentation interface. The method further comprises receiving, from the user, a request for a second presentation interface including a display interface configured to display an image relating to a computer representation of the three-dimensional object and a control interface configured to accept inputs capable of modifying parameters associated with the three-dimensional object. The method further comprises transmitting the request for a second presentation interface to the server, receiving, from the server, the second presentation interface, and displaying the second presentation interface to the user.

In some embodiments, the first control interface is further configured to accept an input requesting a check of the three-dimensional printability of a computer representation of a three-dimensional object. The method further comprises accepting, from the user, an input requesting the check of the three-dimensional printability of the object, transmitting the input to the server, receiving from the server a report enumerating the series of checks, and displaying the report to the user.

In some embodiments, the first input includes a material selection, and the first control interface is further configured to accept an input requesting a check of the three-dimensional printability of a computer representation of a three-dimensional object. The method further comprises accepting, from the user, an input requesting the check of the three-dimensional printability of the object in the material selected, transmitting the input to the server, receiving from the server a report enumerating the series of checks, and displaying the report to the user.

In some embodiments, the request further comprises at least one or more inputs comprising the group of user interface location, object reset, object material selections, object printing choices, object pricing, and object markup. The method further comprises displaying to the user, responsive to the request, the second presentation interface.

In some embodiments, the second control interface is further configured to accept at least one or more second inputs comprising the group of object material selections, object printing choices, object pricing request, and object purchase request. The method further comprises receiving, from the user interacting with the second control interface, the one or more second inputs, transmitting the one or more second inputs to the server, receiving from the server an image relating to the object responsive to the one or more second inputs, and displaying the image to the user within the second presentation interface.

Another aspect is directed to a computer implemented method that comprises providing, by a first server, to a user interacting with the display of a client computer in a distributed computer system, a presentation interface including a display interface configured to display an image relating to a computer representation of one or more three-dimensional objects and a control interface configured to accept inputs capable of modifying at least one of the one or more three-dimensional objects. The method further comprises receiving at the first server, from the user interacting with the presentation interface, a request for modifying the at least one of the one or more three-dimensional objects. The request includes at least one object identifier and one or more functions of the group comprising a union function, an intersection function, a subtraction function, and an embossing function. The method further comprises requesting, from a second server in a distributed computer system, an updated image relating to the computer representation of the modified one or more three-dimensional objects. The method further comprises receiving the updated image from the second server responsive to the request and displaying, by the first server, the image within the presentation interface.

In some embodiments, the request includes the at least one object identifier and the union function, and the updated image includes a modified three-dimensional object combining the one or more three-dimensional objects.

In some embodiments, the request includes the at least one object identifier and the intersection function, and the updated image includes a modified three-dimensional object including only a portion in which the one or more three-dimensional objects overlap.

In some embodiments, the request includes the at least one object identifier and the subtraction function, and the at least one object identifier relates to a first three-dimensional object and a second three-dimensional object. The updated image includes a modified three-dimensional object excluding a portion from the second object that overlaps the first object.

In some embodiments, the request includes the at least one object identifier and the embossing function, and the method further comprises receiving at the first server, from the user interacting with the control interface, a pattern, a minimum value, and a maximum value for the embossing function. The updated image includes the pattern applied to the one or more three-dimensional objects based on the maximum value and the minimum value.

In some embodiments, the minimum value is zero and the maximum value is positive, and the updated image includes the pattern embossed on the one or more three-dimensional objects, based on the maximum value.

In some embodiments, the minimum value is negative and the maximum value is zero, and the updated image includes the pattern engraved on the one or more three-dimensional objects, based on the minimum value.

In some embodiments, the minimum value is negative and the maximum value is positive, and the updated image includes the pattern engraved on a first portion of the one or more three-dimensional objects, based on the minimum value, and embossed on a second portion of the one or more three-dimensional objects, based on the maximum value.

In some embodiments, the minimum value is negative, and based on a magnitude of the minimum value exceeding a limiter for printing the one or more three-dimensional objects, the minimum value is updated based on the limiter.

In some embodiments, the maximum value is zero, and the updated image includes the pattern engraved on the one or more three-dimensional objects based on the updated minimum value.

Another aspect is directed to a distributed computer system comprising a first server, a second server, and a client component. The system is configured to provide, by a first server, to a user interacting with the display of a client computer in a distributed computer system, a presentation interface including a display interface configured to display an image relating to a computer representation of one or more three-dimensional objects and a control interface configured to accept inputs capable of modifying at least one of the one or more three-dimensional objects. The system is further configured to receive at the first server, from the user interacting with the presentation interface, a request for modifying the at least one of the one or more three-dimensional objects. The request includes at least one object identifier and one or more functions of the group comprising a union function, an intersection function, a subtraction function, and an embossing function. The system is further configured to request, from a second server in a distributed computer system, an updated image relating to the computer representation of the modified one or more three-dimensional objects. The system is further configured to receive the updated image from the second server responsive to the request and display, by the first server, the image within the presentation interface.

In some embodiments, the request includes the at least one object identifier and the union function, and the updated image includes a modified three-dimensional object combining the one or more three-dimensional objects.

In some embodiments, the request includes the at least one object identifier and the intersection function, and the updated image includes a modified three-dimensional object including only a portion in which the one or more three-dimensional objects overlap.

In some embodiments, the request includes the at least one object identifier and the subtraction function, and the at least one object identifier relates to a first three-dimensional object and a second three-dimensional object. The updated image includes a modified three-dimensional object excluding a portion from the second object that overlaps the first object.

In some embodiments, the request includes the at least one object identifier and the embossing function, and the system is further configured to receive at the first server, from the user interacting with the control interface, a pattern, a minimum value, and a maximum value for the embossing function. The updated image includes the pattern applied to the one or more three-dimensional objects based on the maximum value and the minimum value.

In some embodiments, the minimum value is zero and the maximum value is positive, and the updated image includes the pattern embossed on the one or more three-dimensional objects, based on the maximum value.

In some embodiments, the minimum value is negative and the maximum value is zero, and the updated image includes the pattern engraved on the one or more three-dimensional objects, based on the minimum value.

In some embodiments, the minimum value is negative and the maximum value is positive, and the updated image includes the pattern engraved on a first portion of the one or more three-dimensional objects, based on the minimum value, and embossed on a second portion of the one or more three-dimensional objects, based on the maximum value.

In some embodiments, the minimum value is negative, and based on a magnitude of the minimum value exceeding a limiter for printing the one or more three-dimensional objects, the minimum value is updated based on the limiter.

In some embodiments, the maximum value is zero, and the updated image includes the pattern engraved on the one or more three-dimensional objects based on the updated minimum value.

Other aspects of the system, method, scripting language, programming interface, development environment, and user interface are described herein.

BRIEF DESCRIPTION OF DRAWINGS

The accompanying drawings are not drawn to scale. In the drawings, each identical or nearly identical component that is illustrated in various figures is represented by a like numeral. For purposes of clarity, not every component may be labeled in every drawing. In the drawings.

DETAILED DESCRIPTION OF INVENTION

Three-dimensional (3D) printing, also known as additive manufacturing, is a growing field in which companies and individuals are taking advantage of improving technologies for manufacturing. As more and more consumers use 3D printers and purchase products manufactured using 3D printing, a key limitation remains in consumer adoption. To access and use 3D printing, individuals generally must learn how to develop solid models (3D printable objects) using a variety of solid modeling tools. The solid modeling tools are, generally speaking, software that users install on a computer. Use of solid modeling software tools is generally complex and requires an investment of time and energy that is well beyond the interest level and capabilities of most consumers. Also, solid modeling tools push the limits of computer capabilities, often requiring users to install dedicated hardware, such as a graphics processing unit (GPU) in order to accommodate the computing required to handle, manipulate and render 3D printable objects. At a time when consumers interact primarily with handheld and mobile devices, solid modeling is often beyond the graphical capabilities of these devices.

Described herein are example systems, methods and scripting languages and aspects for enabling users to manipulate 3D printable objects. In an embodiment, a scripting language and its associated commands may be communicated over a communication network between systems using hypertext transfer protocol (HTTP) and may include HTTP functions such as "GET" and "POST" among others. The reference to "GET/POST" may include either of the functions. Also, script language API endpoint calls, variables, classes and other objects are referenced in quotations along with available HTTP functions.

Manipulating 3D Objects

Figure 1:
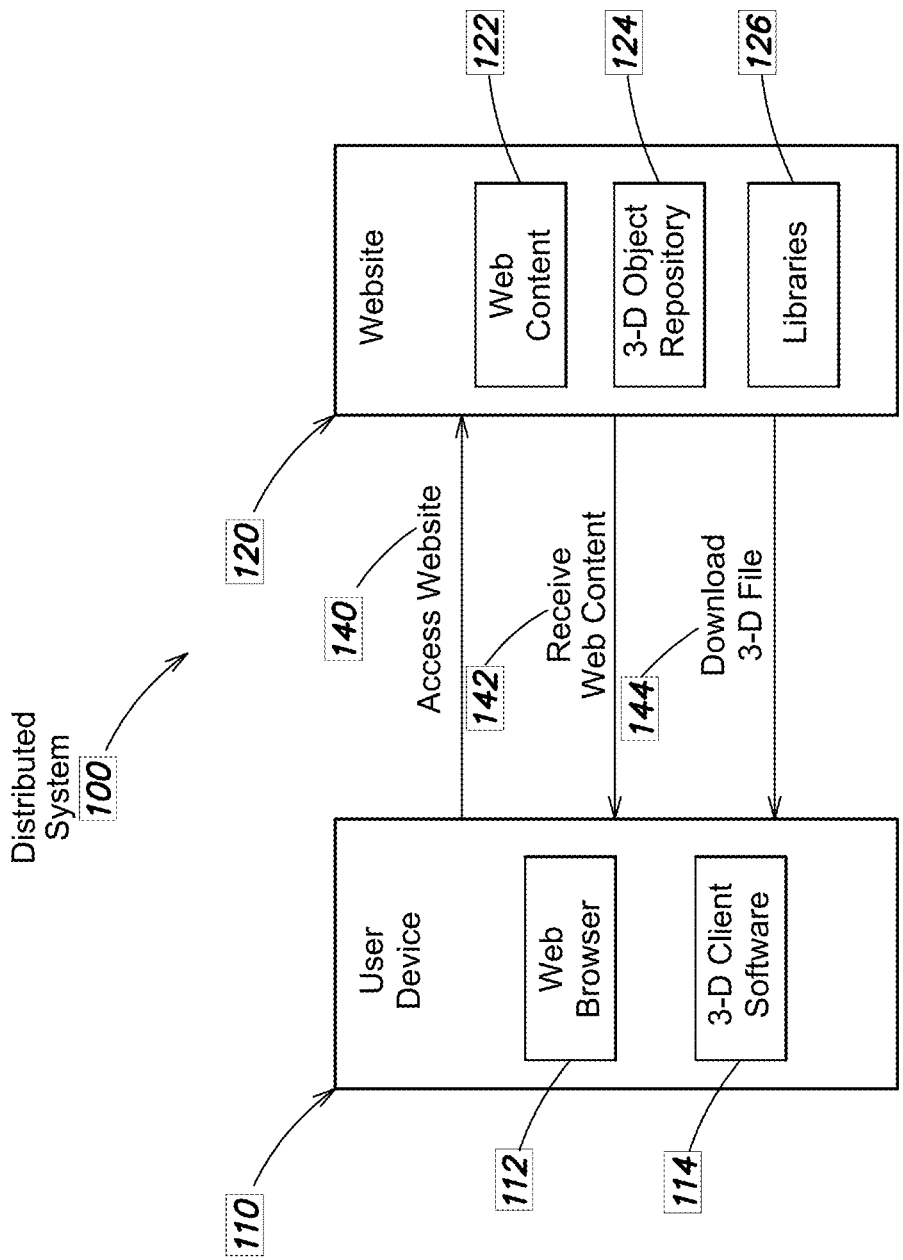
FIG. 1 is an exemplary system diagram in accordance with one embodiment of the present disclosure.

The inventors have recognized that a problem to be solved is to present 3D printable object information to consumers, to give those consumers the ability to manipulate and modify 3D printable objects, and to enable those consumers to purchase and print modified 3D objects. As shown in FIG. 1, a distributed system 100 for sharing 3D printable objects may include a user device 110 and a website 120. The user device 110 may include a web browser 112 and 3D client software 114. The 3D client software 114 may include solid modeling tools and other software resident on the user device 110 that are used to manage, handle, modify, manipulate, render, and otherwise edit 3D printable objects.

The user interacting with a user device 110 accesses 140 a website. The website may include web content 122, a 3D object repository 124, and various libraries 126 of possible materials, geometries, pricing, and so forth. The user, accessing the website 120 through the web browser 112 on the user device 110 views the web content 122 and interacts with the 3D object repository 124. In some embodiments, users may load 3D printable objects created in 3D client software 114 into the 3D object repository 124. In other embodiments, users may copy 3D printable objects available for download from the 3D object repository 124 on the website 120. Copying the 3D printable object from the repository 124 may include downloading a 3D file representing the 3D printable object. The 3D file may be in a variety of formats, such as the STL or X3D file standards.

A key limitation to the distributed system 100 as shown in FIG. 1 is that the user is able to download 144 a 3D file, and once the file has been downloaded, the user may modify the file in any manner he or she sees fit. The user may also print as many 3D objects he or she wishes. Finally, the user may distribute the file to others, potentially without limitation. In some embodiments, the downloaded 3D file may be in a different format than the electronic format in which the 3D printable object was created. For example, in some embodiments, the original 3D printable object may be defined parametrically, such as in the form of a script and various defining parameters, while the downloaded file may be in STL or X3D format.

Figure 2:
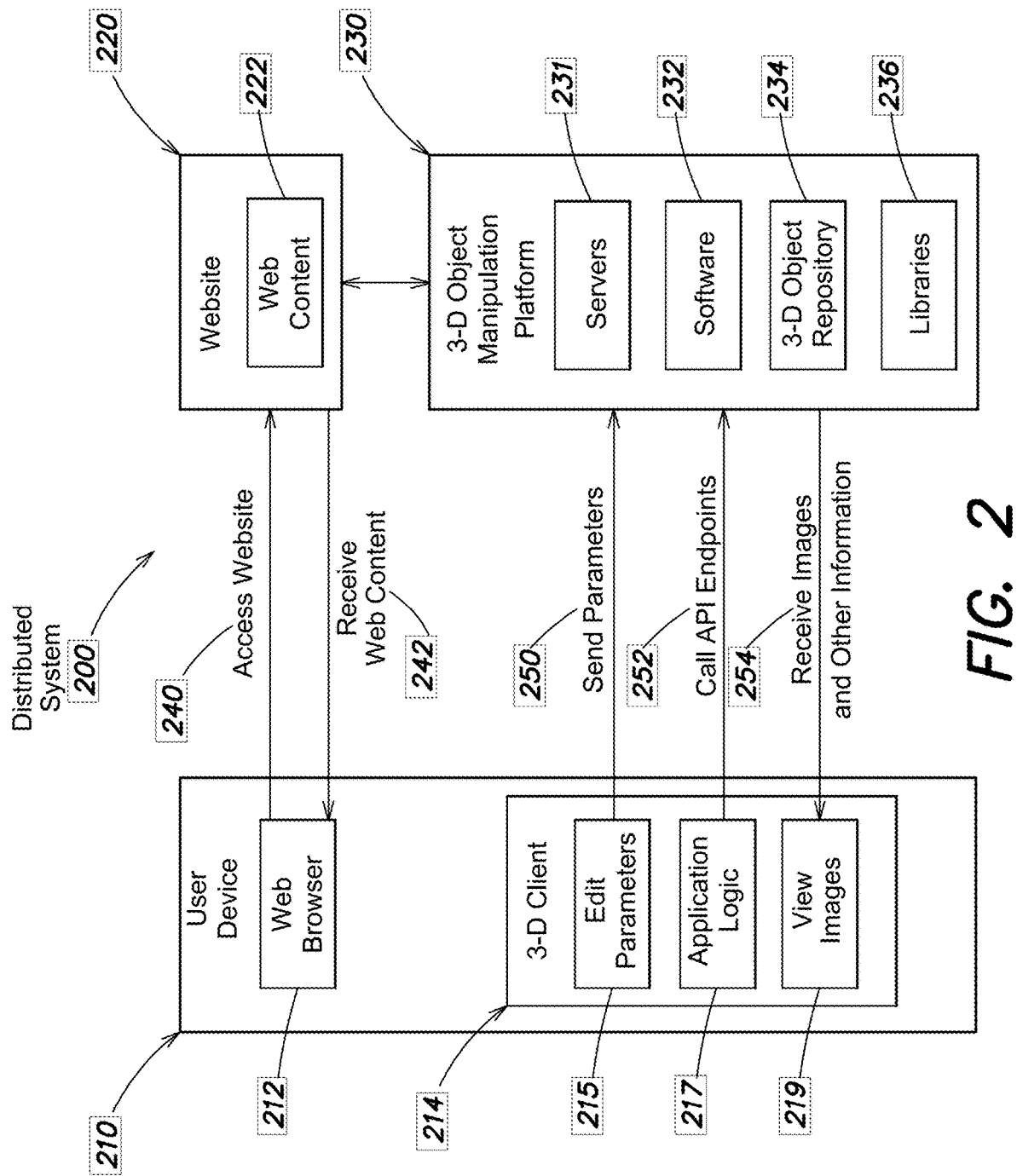
FIG. 2 is an exemplary system diagram in accordance with one embodiment of the present disclosure.

FIG. 2 illustrates a distributed system 200 for manipulating 3D printable objects that may include a user device 210, a website 220, and a 3D object manipulation platform 230. A user interacts with a user device 210, such as a personal computer, laptop, tablet, or mobile device. Through the user device 210, the user interacting with a web browser 212 accesses 240 a website 220 to interact with web content 222 related to 3D printable objects. The user device may receive web content 242 from the website 220. The website 220 may also interact with a 3D object manipulation platform 230 that may enable the user to manipulate a 3D printable object without first downloading a 3D file 144, such as with reference to FIG. 1 above. In another embodiment, the user device may be capable of storing a reference to a modified file or object without downloading the file associated with the object.

The user device 210 also includes a 3D client 214 capable of editing parameters 215, employing application logic 217, and viewing images 219. The 3D object manipulation platform 230 may include servers 213, software 232, a 3D object repository 234, and various libraries 236 of possible materials, geometries, pricing, and so forth. The software 232 within the 3D object manipulation platform 230 performs a variety of tasks including, but not limited to: processing scripts, caching images, responding to calls to API endpoints, rendering models, checking geometry, checking printability of 3D objects, pricing 3D print jobs, and so forth. The 3D client 214 may operate wholly within the web browser 212, the 3D client 214 may be a separate software application, or the 3D client 214 may be a combination of software operating within the web browser 212 and standalone software operating on the user device 210 independently of the web browser 212.

When manipulating a 3D printable object in the distributed system 200 as depicted in FIG. 2, a user interacting with the 3D client 214 sends parameters 250 to the 3D object manipulation platform 230. As will be discussed in greater detail below, in some embodiments, sending parameters 250 may include an identifier to specify which 3D printable object the user is manipulating. In some embodiments, the identifier may also identify the user and/or the user's session with respect to the 3D object manipulation platform 230. The 3D client 214 may give the user the ability to edit parameters 215 associated with a 3D printable object. In addition to sending edited parameters 250, the application logic 217 may also call API endpoints 252 to perform a variety of functions discussed herein. Depending on the parameters sent 250 and API endpoints 252 the 3D client 214 calls, the software 232 on the 3D object manipulation platform 230 responds by sending images and other information. The images may take the form of a 2-D raster image or a static 3D image. The 3D client 214 receives the images and other information 254 sent by the 3D object manipulation platform 230. The 3D client 214 includes a viewer so that the user may view images 219 of the manipulated object. Notably, the 3D client does not receive the 3D object file, but rather the 3D client operates on the object remotely and receives a rendered image within the user interface.

In some embodiments, the user views images 219 of a 3D printable object. The user then manipulates the 3D printable object by interacting with a set of controls, within the 3D client 214, which enable the user to edit parameters 215 associated with the 3D printable object. Based upon the nature of the user's changes to the parameters, the application logic 217 within the 3D client 214 calls API endpoints 252 from the 3D object manipulation platform 230. The 3D object manipulation platform 230 may find a cached image on a server 231, or the 3D object manipulation platform 230 may render an image, for display 254 to the viewer 219 on the 3D client 214.

In some embodiments, libraries 236 may include possible materials within which to render a 3D printable object, geometric rules for rendering 3D printable objects in various materials, pricing information to enable the 3D object manipulation platform 230 to determine the cost of printing a rendered 3D printable object in a specific material. In some embodiments, the 3D object repository 234 may include 3D printable objects associated with a single shop owner, vendor, or individual who has created the 3D printable objects. In other embodiments, the 3D object repository 234 may include 3D printable objects from a variety of sources, creators, shop owners, designers, and individuals.

3D Object Manipulation Platform

Figure 3:
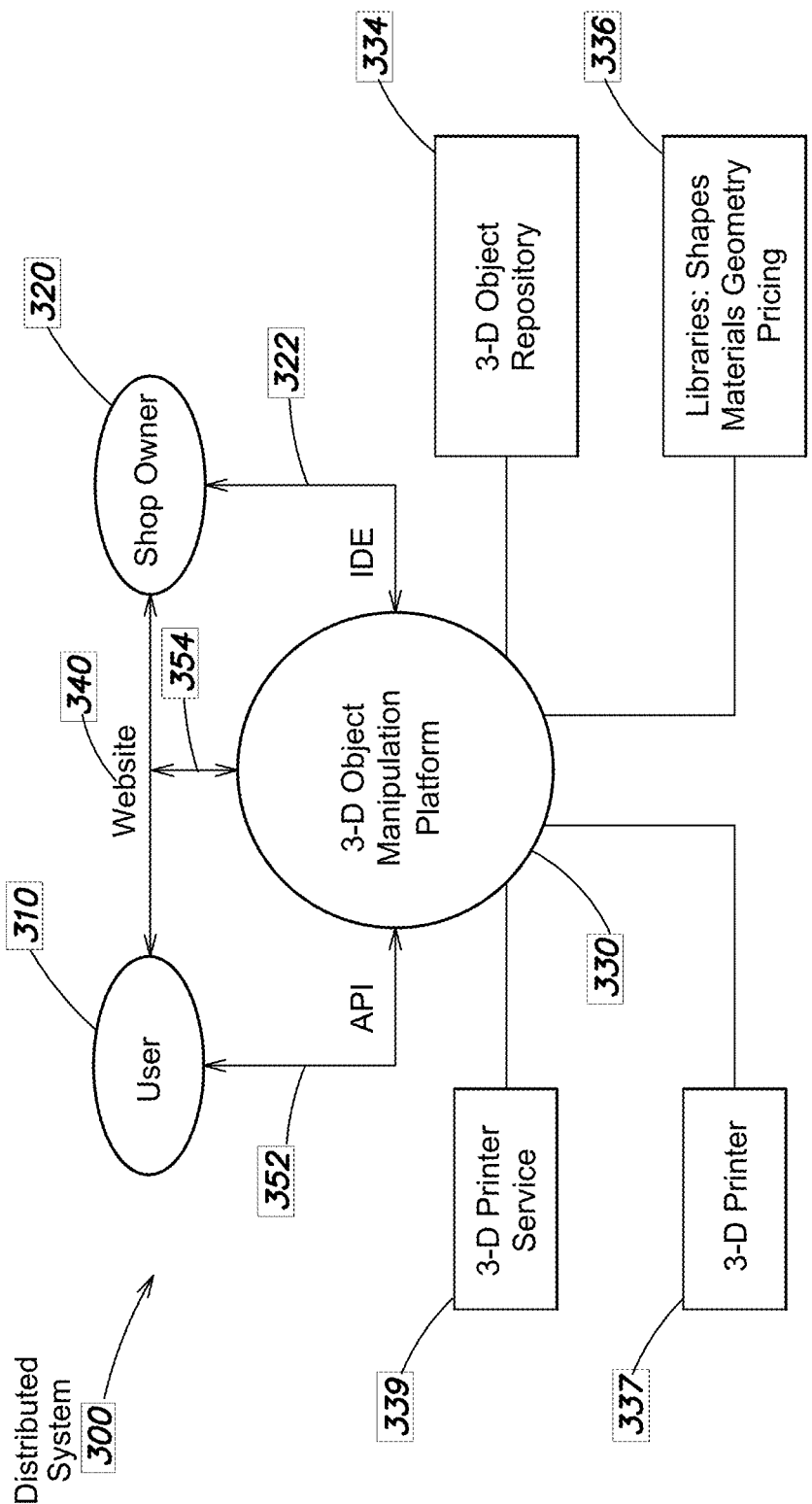
FIG. 3 is an exemplary system architecture diagram in accordance with one embodiment of the present disclosure.

As shown in FIG. 3, in an embodiment, a distributed computer system may include a user 310 interacting with a shop owner 320 and a 3D object manipulation platform 330. In some embodiments, the 3D object manipulation platform 330 may be similar to the 3D object manipulation platform 230 as referenced in FIG. 2, above. The user 310 interacts with the shop owner 320 through the shop owner's website 340. The website 340 may include one or more 3D printable objects that the user 310 may access, customize, select a material, render, and print to either a local printer 337 or a 3D printing service bureau 339. In some embodiments, the shop owner 320 may host the website 340 and the 3D object manipulation platform 330. In other embodiments, the shop owner 320 may not host either of the website 340 or the 3D object manipulation platform 330. In yet other embodiments, the shop owner 320 may host either the website 340 or the 3D object manipulation platform 330, but not both.

In an embodiment, the user 310 interacts with the website 340 and the 3D object manipulation platform 330 through a series of hypertext transfer protocol (HTTP) requests. In some embodiments, the user requests originate in a web browser, such as the web browser 212 as referenced in FIG. 2, above. In other embodiments, the HTTP requests may originate in a dedicated application, such as a mobile application. The 3D object manipulation platform 330 may present images within a user interface (UI) within a dedicated 3D client, such as the 3D client 214 as referenced in FIG. 2, above. In some embodiments, the user 310 interacts with the services provided by the 3D object manipulation platform 330 through an application programming interface (API) 352. The 3D object manipulation platform 330 may present images 354 to the user 310, either directly or through the website 340 presented by the shop owner, as part of the stream of HTTP traffic to and from the user's 310 web browser. In some embodiments, the presentation of images and other information 354 by the 3D object manipulation platform 330 may be similar when the user receives images and other information 254 as referenced in FIG. 2, above.

As similarly discussed with reference to FIG. 2, in embodiments above, the 3D object manipulation platform 330 provides the user 310 with access to a 3D object repository 334 of 3D printable objects. The 3D object manipulation platform 330 accesses libraries 336 of potential shapes, materials, geometry and pricing to facilitate rendering, printability checks, and pricing checks for 3D printing options. The 3D object manipulation platform 330 may enable a user 310 to print to a local 3D printer 337 or to use a third-party 3D print service bureau 339. For many consumer users 310, the third-party service bureau 339 may provide higher-quality 3D printing options with improved capabilities (e.g., size, material choices, voxel resolution, and so forth) than available with consumer 3D printers.

The shop owner 320 interacts, as will be discussed with reference to FIG. 4, below, with the 3D object manipulation platform 330 through an integrated development environment (IDE) 322. The primary interaction between the shop owner 320 and the 3D object manipulation platform 330 includes loading 3D printable models into the 3D object repository and generating a user interface (UI) to present to the user 310, such as the 3D client 214 as referenced in FIG. 2, above. Through the IDE 322, the shop owner 320 may also define parameter ranges for a specific 3D printable object, specify materials, and determine pricing policies, such as markup for modified 3D printed objects.

Process Flow

Figure 4:
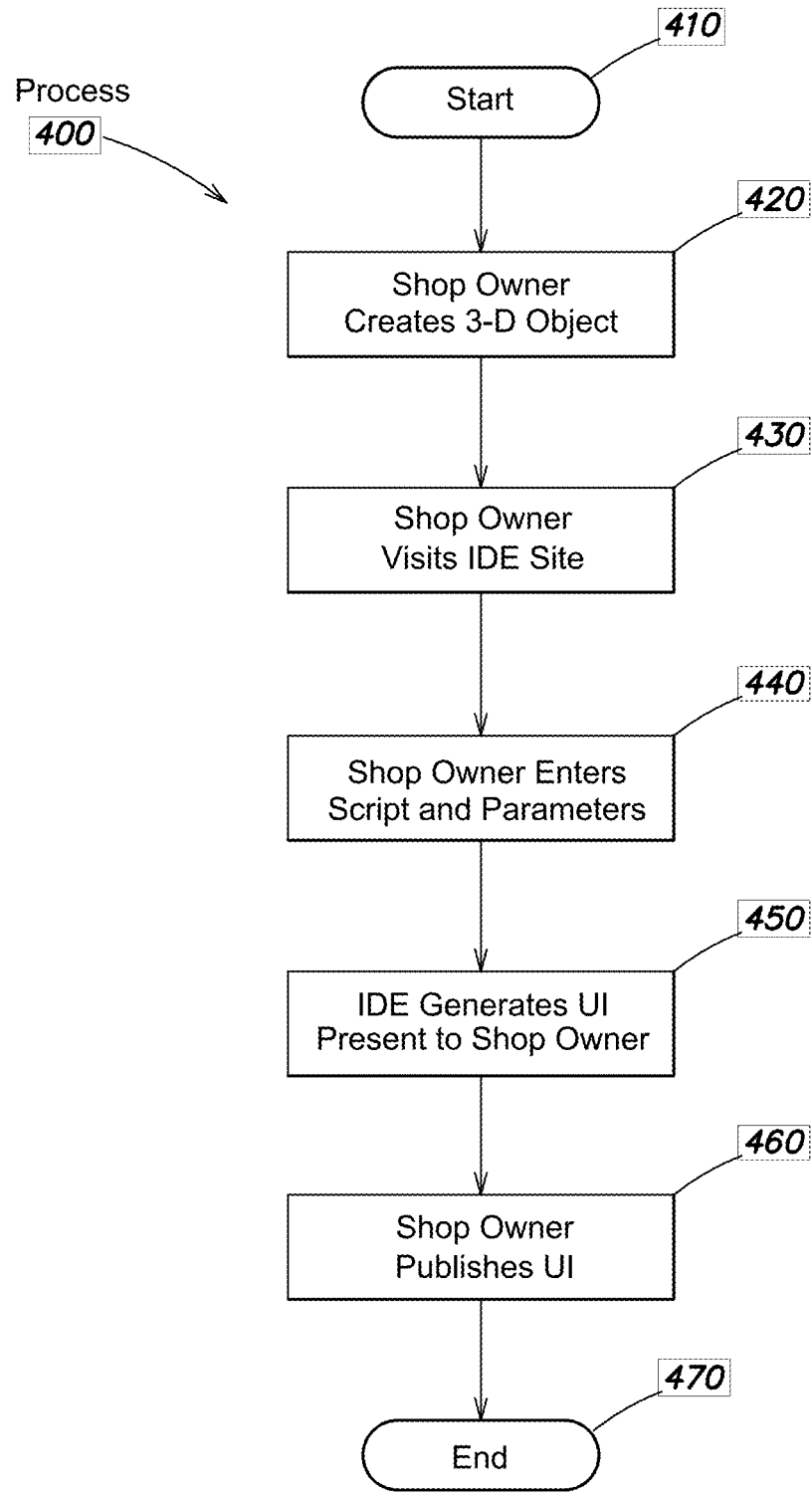
FIG. 4 illustrates an exemplary process for generating a user interface in accordance with one embodiment of the present disclosure.

In an embodiment, a shop owner may create a UI according to a process 400 as depicted in FIG. 4. At block 410, the process 400 starts. At block 420, a shop owner creates a 3D printable object. In some embodiments, the 3D printable object may be defined using conventional 3D solid modeling tools and stored in an electronic file. In some embodiments, the 3D printable object may be defined parametrically and may comprise a script and a set of parameters. The shop owner may create the 3D object on his or her own, or the shop owner may employ a third-party individual, company, or service with solid modeling capabilities to generate a solid model from drawings, sketches, scans or other inputs.

At block 430, the shop owner interacts with an integrated development environment, which may include dedicated software or an IDE website. The IDE may include controls, text editors, and other input tools to represent the various aspects of the solid model associated with the 3D printable object. Other inputs may define preferences associated with the UI, how the UI is presented, the material options available to the user of the UI, pricing and markup options, and so forth.

At block 440, the shop owner enters the script into the text editor control and defines relevant parameters and parameter ranges through other inputs within the IDE. At block 450, the IDE generates the UI and presents the UI to the shop owner. Block 450 may offer additional options to make further changes to the UI, to define how to save and store the UI, to update shop owner preferences, and so forth. At block 450, the IDE may offer the shop owner additional tools for managing multiple 3D printable objects and UI interfaces.

At block 460, the shop owner publishes the UI. In some embodiments, the shop owner may host the UI and the 3D platform. In other embodiments, the UI may be hosted by a third party that also hosts the 3D platform. In yet other embodiments, the shop owner may host the UI within a web page, though the UI may link to 3D object manipulation platform services as provided by a third party. At block 470, the UI is published and the process 400 ends.

Figure 5:
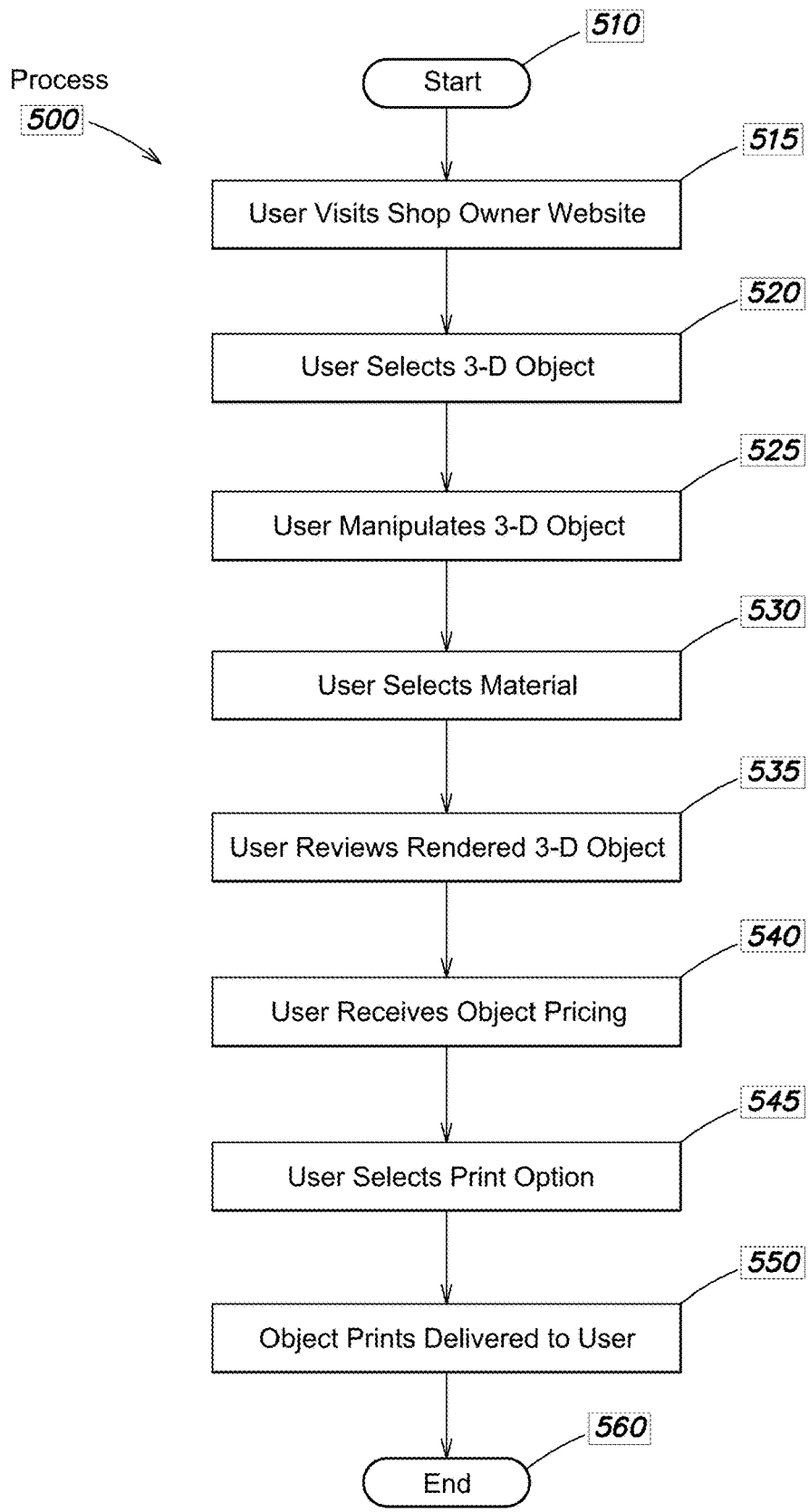
FIG. 5 illustrates an exemplary process for manipulating a computer representation of a three-dimensional object in accordance with one embodiment of the present disclosure.

In one embodiment, a user selects, manipulates and prints a 3D printable object as shown in FIG. 5. The process 500 starts at block 510. At block 515, a user visits a shop owner website offering one or more 3D printable objects for sale. At block 520, the user, interacting with the website, selects a 3D printable object. At block 525, interacting with a user interface, such as the UI generated in FIG. 4, above, or the 3D client 214 as referenced in FIG. 2, above, manipulates the 3D object. The user may manipulate the object in a number of ways. The user may modify parameters associated with the 3D object. The user may also move the object within a viewing window. For example, the user may select the object and may rotate, pan, zoom, or move the object in any other manner within the view.

At block 530, the user may select a material in which to render the 3D object. At block 535, the 3D platform returns the rendering and, the user is able to view an image of the 3D object rendered in the material. In some embodiments, the user may select a new material and may further manipulate the object, view it, and alter additional parameters. At block 540, the user receives pricing information related to the cost of printing the 3D object in the selected material. The pricing information may include various print options, such as options to print the object locally or to print through one of several service bureaus. In some embodiments, the printing options may be similar to those defined by the shop owner in any of blocks 440, 450 and 460 as referenced in FIG. 4, above. In some embodiments, the user may select a new material, and the user may further manipulate the object, edit parameters, and view the rendered object within the viewer. At block 545, the user selects a print option. At block 550, the object is printed, either on a local printer associated with the user or through a third-party service bureau, and the object is delivered to the user. At block 560, the process 500 ends.

Shop Owner Options

Figure 6:
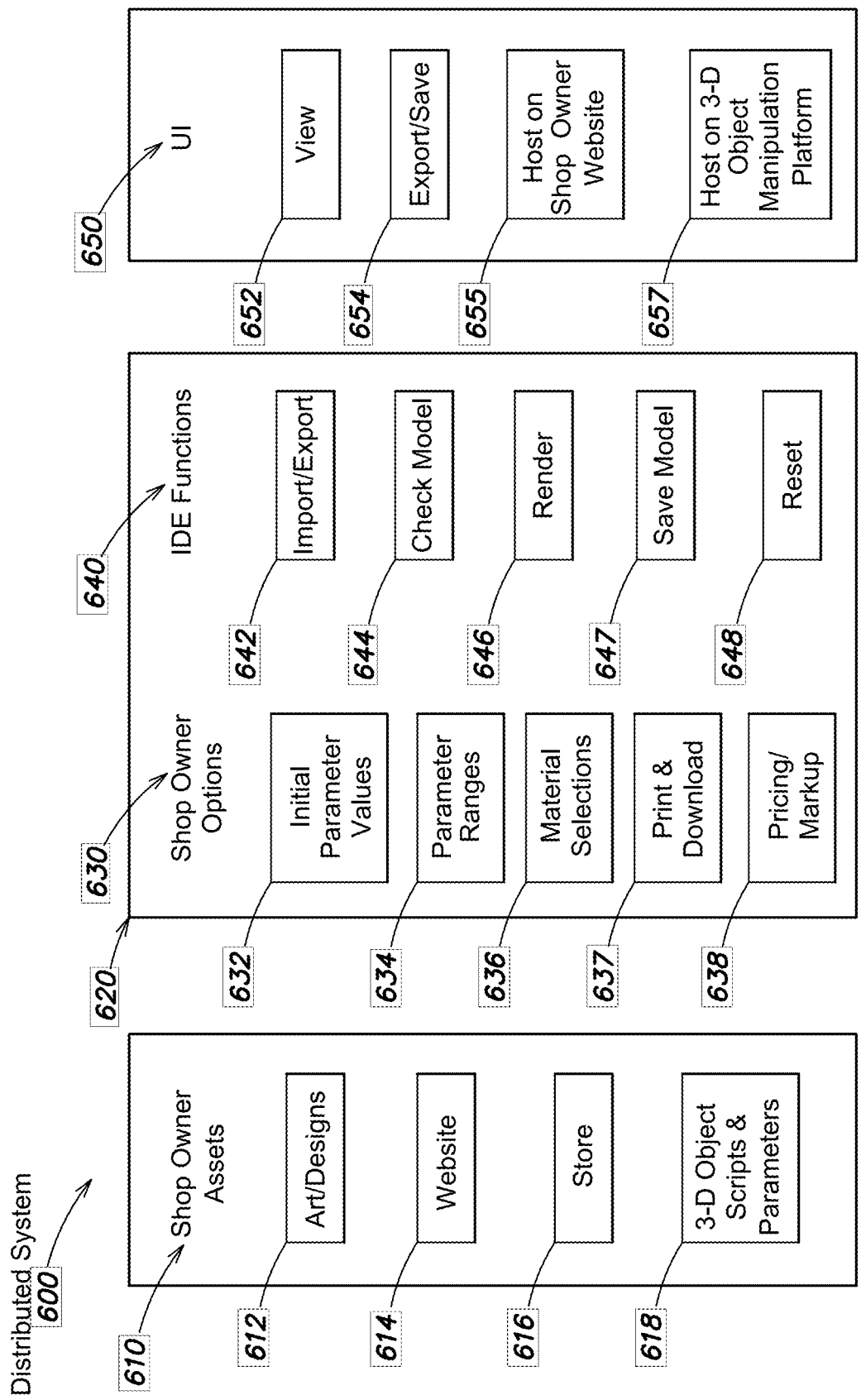
FIG. 6 is an exemplary system diagram in accordance with one embodiment of the present disclosure.

The user-facing UI incorporates numerous aspects as shown in the distributed system 600 depicted in FIG. 6. The shop owner has numerous assets 610 relevant to creating and presenting 3D printable objects to users. The IDE 620 offers a shop owner a number of shop owner options 630 as well as IDE functions 640 that lead to the generation of a user-facing graphical user interface GUI 650.

The shop owner assets 610 may include a body of artwork and designs 612, a website 614, a store 616 that may include a web-based storefront, and a body of 3D printable objects 618 that may include 3D objects, scripts and parameters. In some embodiments, a shop owner may operate a brick-and-mortar store 616. In some embodiments, the store 616 may be a web-based store. In yet other embodiments, the store 616 may be a collection of 3D printable objects found on a third-party website or object repository, such as a 3D object repository 124 as referenced in FIG. 1, a 3D object repository 234 as referenced in FIG. 2, or a 3D object repository 334 as referenced in FIG. 3. As discussed above, a shop owner may possess expertise more closely related to design and may not have extensive experience in solid modeling or developing user interfaces. A shop owner may contract a third party to develop a 3D printable solid model from an existing design or product.

The IDE 620 may offer a number of options 630 to a shop owner. These options may include initial parameter values 632, parameter ranges 634, material selection 636 choices, print and download 637 options, and pricing/markup 638 options. For a given script describing a 3D printable object, a shop owner may wish to define initial parameter values 632 to determine the look and feel of a 3D object within the UI. Additionally, the shop owner may wish to define a range of parameter values 634 within which a user may modify an object. Depending on how an object is defined as a script, small changes in one parameter may lead to large changes in the way an object appears; therefore, it is important to give the shop owner the ability to define a range within which a user may modify an object. For example, a shop owner may have a particular "look" that he or she wishes to maintain, and for this reason, the shop owner may not allow any modifications of some parameters. In some embodiments, the shop owner may define limited modifications to other parameters by articulating a parameter range 634. Additionally, the shop owner may specify which materials a user may select 636. For example, a shop owner may publish a 3D printable piece of jewelry and allow printing in gold and silver but not plastic or steel, or other material type.

In one embodiment, the IDE 620 may offer shop owner options 630 that relate to a business model such as print and download options 637. For example, a shop owner may allow users to download a version of the 3D object as modified by the user and render the 3D object in a selected material. In some embodiments, the download file may include the full script and parameters defined by the shop owner. In other embodiments, the download file may be in a different format, for example, a triangle-based, non-parametric electronic file such as in the STL format. In some embodiments, a shop owner may not allow any downloads of an electronic file, except to a local printer. In other embodiments, the shop owner may allow a download of an electronic file only to a third-party 3D printing service bureau. Another shop owner option may include pricing and markup 638, such as the price to download a file, the price to print a 3D object on a local printer, and/or the price to print a 3D object through a third-party 3D service bureau. In pricing involving third parties such as service bureaus, the shop owner may elect to mark up the service bureau's pricing. For example, a shop owner may mark up all printing costs by 100%. The IDE 620 may provide an array of controls that enable the shop owner to access the shop owner options 630 as described above.

The IDE 620 may also include a range of IDE functions 640. The IDE functions 640 may include the ability to import or export 3D printable object files (e.g., element 642), check a model for printability and other characteristics (e.g., element 644), render a model in a given material (e.g., element 646), save the model (e.g., element 647), and to reset (e.g., element 648), a loaded model. For 3D objects that are defined by a script and parameters, the abilities may be provided to import a script and parameters, to export the script and parameters, or to export a file depicting a 3D printable object in another (e.g., STL or X3D) format (e.g., via element 642). The IDE 620 may offer a shop owner the ability to check a model (e.g., using element 644) to determine if the model can be printed in the selected material. The check model function may include various variables and parameters by which the printability check is performed. The render function 646 may generate an image of a rendering of the 3D object in a specific material. The save model function 647 may offer the ability to save the model either as a script and parameters or in another format as described above. Finally, the reset function 648 may offer a shop owner the ability to return a model to its initial parameters as defined by the shop owner. IDE 620 may also include an array of controls to enable the shop owner to access the IDE functions 640 as described herein.

An aspect of the IDE 620 is the ability to generate a UI 650 from the script and parameters provided by the shop owner, as further configured by the shop owner options 630 and the IDE functions 640 with which the shop owner interacts. The shop owner may view 652 the UI 650 from the perspective of a user visiting the shop owner's website, such as the website 220 as referenced in FIG. 2, or the website 340 as referenced in FIG. 3, above. The IDE 650 offers the shop owner the ability to export or save 654 the UI.

In some embodiments, the export or save 654 function may include defining a uniform resource identifier (URI) location where the UI will point, such as a directory on the shop owner web page or on a third-party site, depending on where the 3D object manipulation platform is hosted. As discussed herein, different parties may host the UI and the 3D object manipulation platform. For example, if a shop owner were to host the UI but not the 3D object manipulation platform, such as the 3D object manipulation platform 330 as referenced in FIG. 3 above, the UI controls and viewer may still point to a URI associated with the party hosting the 3D object manipulation platform. Similarly, within the IDE 620, a shop owner may opt to host the generated UI for a given 3D printable object on the shop owner website 655. Alternatively, the shop owner may choose to host the UI for a 3D printable object on the 3D object manipulation platform, such as the 3D object manipulation platform 330 as referenced in FIG. 3, above.

In an embodiment, the IDE 620 may operate by accessing the scripting language for accessing the API endpoints and back end server functionality associated with the 3D platform, such as the shop owner 320 interacting with the 3D object manipulation platform 330 through the IDE 322 as referenced in FIG. 3, above. As described herein, the scripting language may include a series of API endpoints for accessing the functionality of the 3D platform. In an embodiment, the IDE 620 may offer shop owner options 630 and IDE functions 640 by calling API endpoints within the scripting language associated with the 3D platform.

Representative System

Figure 7:
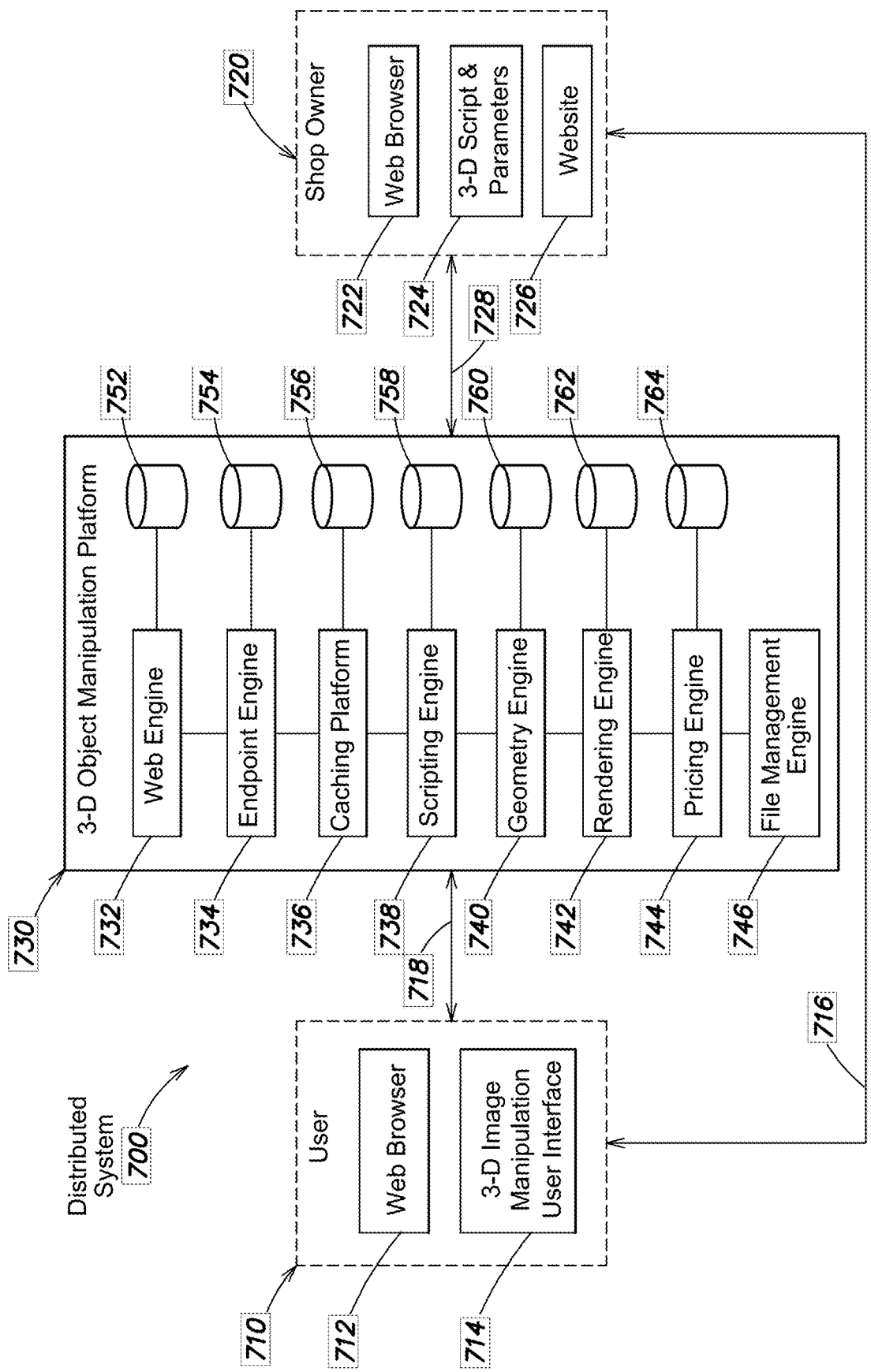
FIG. 7 is an exemplary system architecture diagram in accordance with one embodiment of the present disclosure.

FIG. 7 demonstrates an embodiment of a distributed system 700 that may include a user 710, a shop owner 720 and a 3D object manipulation platform 730. The user 710 interacts with a web browser 712 and a 3D image manipulation user interface (UI) 714. The UI 714 may be similar to the UI 650 generated by the IDE 620 as discussed with reference to FIG. 6, above. The UI may also be similar to the 3D client 214 as referenced in FIG. 2. In an aspect, the user 710 interacts with a shop owner 720 website 726 through the web browser 712. The user 710 may select a 3D printable object, such as a 3D object as defined by a specific 3D script and parameters 724.

As discussed above, the shop owner 720 interacts with the 3D object manipulation platform 730 through an IDE 728, which may be similar to the IDE 620 as referenced in FIG. 6, to create one or more 3D image manipulation user interfaces 714 to present to a user 710. The shop owner 720 may use a web browser 722 to access the IDE 728 and to define and generate the UI 714. The shop owner may also publish a website 726 to engage directly with users 710 over a user connection 716 employing HTTP and other protocols. This user connection 716 may involve communications, such as access website 240 and receive web content 242 as referenced in FIG. 2 and website 340 as referenced in FIG. 3.

In an embodiment, the user 710, through the UI 714, interacts with the 3D object manipulation platform 730 directly through a series of communications 718. The communications 718 may include HTTP requests for HTML content and other application services, such as those services defined by API endpoints as described herein. In another embodiment, the user 710 may interact with the 3D object manipulation platform 730 through the shop owner website.

The 3D object manipulation platform 730 may include a web engine 732 connected to a web database 752, an endpoint engine 734 connected to an endpoint database 754, a caching platform 736 connected to a caching database 756, a scripting engine 738 connected to a scripting database 758, a geometry engine 740 connected to a geometry database 760, a rendering engine 742 connected to a rendering database 762, a pricing engine 744 connected to a pricing database 764, and a file management engine 746. The web engine 732 may perform various web hosting functions that may include, but are not limited to: responding to HTTP requests, delivering HTTP codes, transmitting HTTP traffic, transmitting HTML content, transmitting files, and so forth. The web engine 732 may search content and rules contained within a web database 752. The endpoint engine 734 receives and responds to API endpoint calls received by the web engine 732 and processed by the scripting engine 738. Endpoint rules and content may be stored in an endpoint database 754. As is discussed herein, the 3D object manipulation platform 730 stores requested content in various server caches for a number of reasons that may include performance and user experience. For example, the user interface 714 client is programmed to first call a "*Cached" API endpoint before requesting an image rendered by the server backend. The asterisk in "*Cached" is a wildcard, and numerous API endpoints include cached and un-cached variants. The caching platform 736 searches for cached image files in various storage locations that represent a caching database 756.

The scripting engine 738 receives and responds to function calls to various API endpoints, such as those delivered to the endpoint engine 734 requesting an un-cached endpoint call. In an aspect, the scripting engine 738 processes API endpoint calls to the endpoint engine 734 that cannot be answered with cached content from the caching engine 738. If the response to an API endpoint cannot be answered with cached content, the endpoint engine 734 responds with an error, such as a 400 series HTTP error, to the client, and the client is programmed to respond with an API endpoint call that the endpoint engine 734 passed to the scripting engine 738. The scripting engine 738 may access scripts and other information from a scripting database 758. The scripting database 758 may access aspects of a 3D object repository, such as the 3D object repository 334 referenced in FIG. 3.

In various embodiments, the scripting engine 738 may access a range of functions elsewhere within the 3D object manipulation platform 730. As is discussed herein, the un-cached scripts pass to the scripting engine 738 for additional processing by these other functions that include, but are not limited to: a geometry engine 740, a rendering engine 742, a pricing engine 744, and a file management engine 746. The geometry engine 740 may determine an appropriate geometry for the 3D printable object as rendered in a specific material. The geometry engine 740 may also perform a printability check to determine whether a 3D printable object may successfully print in an additive manufacturing process.

The geometry engine 740 may look up various calculations and material properties in the geometry database 760. The rendering engine 742 creates a 3D rendering of a 3D printable object in a given material. The rendering engine 742 may access a rendering database 762 in order to present an image of the rendered 3D printable object. The pricing engine 744 may look up pricing data in a pricing database 764, the pricing engine 744 may then compare aspects of the 3D printable object to the pricing database 764, and the pricing engine 744 may calculate the cost of printing the 3D object in a given material. The file management engine 746 may retain shop owner preferences and offer various options for saving 3D printable files, saving user interfaces, converting files into alternative electronic formats, and managing user and shop owner permissions.

Integrated Development Environment

Figure 8:
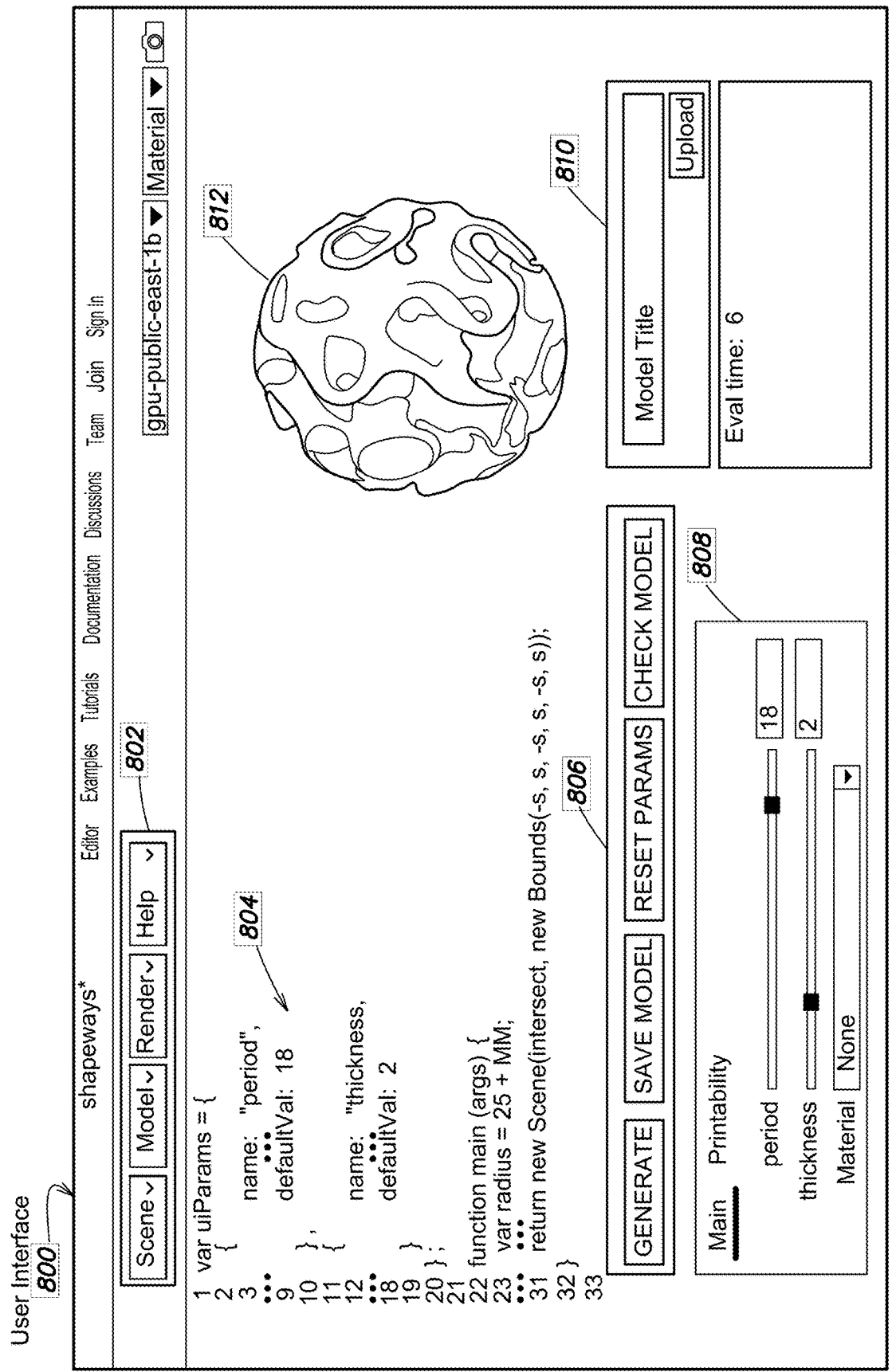
FIG. 8 illustrates an exemplary interface for generating a user interface in accordance with one embodiment of the present disclosure.

An embodiment of a user interface 800 is shown in FIG. 8. This user interface 800 may be similar to the IDE 620 depicted with reference to the distributed system in FIG. 6, above. The user interface may include a set of drop down controls 802, a text editor 804, control buttons 806, slider bars and text boxes 808 for editing parameters, a file management control 810, and a viewer 812 capable of displaying a 2-D rendering of a 3D printable object. In an embodiment, the drop down controls may include a series of shop owner options, such as the shop owner options 630 referenced in FIG. 6. In an embodiment, the text editor 804 may offer a shop owner the ability to copy a solid modeling script and edit characteristics of the script in the editor. In an embodiment, the control buttons 806 may offer a set of IDE functions, such as the IDE functions 640 discussed in FIG. 6. In an embodiment, the slider bars and text boxes 808 may enable a shop owner to modify parameters values and to set parameter ranges, such as depicted in initial parameter values 632 and parameter ranges 634 as referenced in FIG. 6. In various embodiments the file management control 810 may allow a shop owner to load a script and parameters, to name a model, and to save a model. The viewer window 812 offers the shop owner the ability to see a 2-D rendering of the 3D printable object. The viewer window 812 may offer a user the ability to select the object and to use controls to rotate the object and to pan, tilt and zoom the object within the viewer window 812.

User Interaction

Figure 9:
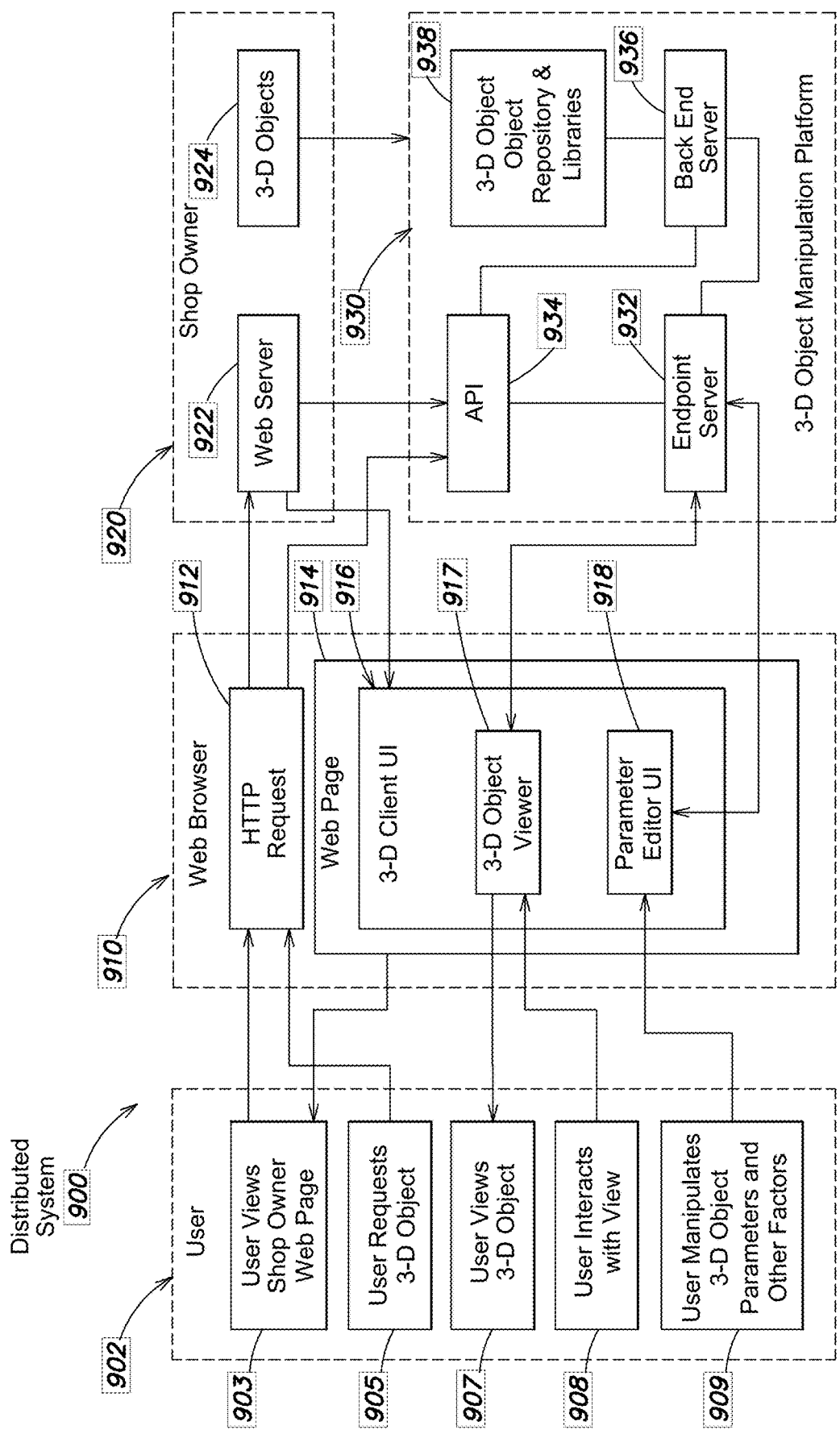
FIG. 9 is an exemplary system diagram in accordance with one embodiment of the present disclosure.

In various embodiments, a user interacts with a distributed system such as the distributed system 900 as shown in FIG. 9. The user 902 primarily interacts with the distributed system 900 through the web browser 910. The web browser 910 brokers interactions between the user 910 and a shop owner 920 and a 3D object manipulation platform 930. In one embodiment, the interaction begins with the user 902 viewing a shop owner web page 903 through a HTTP request 912 which requests information from the shop owner's web server 922. The web server responds with a web page 914 viewable by the user 902 within the web browser 910. In subsequent interactions, the user 902 may request a 3D object 905 as represented by an image or a link. The request for the 3D object may take the form of an HTTP request 912 which may include a call to an API endpoint through the API 934 of the 3D object manipulation platform 930. In some embodiments, the API endpoint call may be the POST "updateScene" call, which passes an identifier for the user and the 3D object along with parameter values to set the 3D object and initial parameters.

The 3D object may originate with the shop owner 920 who develops solid models for various 3D objects 924. As discussed above, with reference to FIG. 4 and FIG. 6, the shop owner 920 may interact with an IDE to load 3D objects into an object repository within the 3D object manipulation platform 930 and/or to create a user interface for manipulating 3D objects. Within the 3D object manipulation platform 930, the 3D object repository and libraries 938, which may be similar to the 3D object repository 234 and libraries 236 with reference to FIG. 2 above, are accessible through the back end server 936.

In an embodiment, when the HTTP request 912 associated with a user request for a specific 3D object 905 reaches the 3D object manipulation platform 930, the API 934 passes the request to the back end server 936 which processes the request, renders a 2-D image of the 3D object and passes the image to an endpoint server 932.

In some embodiments, the back end server 936 may pass the image directly to the user as discussed herein with reference to the endpoint server 932. In some embodiments, the endpoint server 932 and the back end server 936 may be the same computing device. In an embodiments, as is discussed herein with respect to API endpoints for cached content, the HTTP request 912 reaches the 3D object manipulation platform 930 and passes to the endpoint server 932, which searches for a cached version of the 3D image of the 3D object and presents the image to the 3D client UI 916. Also, as is discussed herein, the API 934, back end server 936 and endpoint server 932 may communicate various error and success messages over HTTP to the web browser 910 and client software, such as the 3D client UI 916 and associated components.

In an embodiment, the 2-D image of the 3D object may be displayed within the "Creator" User Interface 916, which may include a 3D object viewer 917. The 3D client UI 916 may be the user interface that the shop owner generates from within the IDE. In some embodiments, for example, the UI 650 as referenced in FIG. 6, above, may be similar to the 3D client UI 916. As is discussed above with reference to FIG. 6, the shop owner visits the IDE 620, inputs a number of shop owner options 630 and accesses several IDE functions 640. The IDE 620 then generates the UI 650, which the shop owner may host on a website 655 or on a 3D object manipulation platform 657.

In the embodiment shown in FIG. 9, the 3D client UI 916 is hosted on the 3D object manipulation platform 930 and displays within a web page 914. In other embodiments, different hosting and delivery architectures may be possible, and, for example, the 3D client UI 916 may exist within a dedicated application (e.g., a mobile application) and not a web browser. Also, as depicted, the 3D client UI 916 may include a 3D object viewer 917 and a parameter editor UI 918. The parameter editor UI 918 may include an array of controls capable of accepting inputs related to changing the parameters of a 3D printable object. The 3D object viewer 917 may include a display area for viewing 2-D images of the 3D object. For example, in some embodiments, the 3D object viewer 917 may be similar to the viewer 812 within the IDE as referenced in FIG. 8, above. Once a 2-D image of the 3D object is presented to the 3D client UI 916, the user may then view the 3D object 907.

In an embodiment, the user 902 may interact with the 3D object in a number of ways. The user 902 may select the 3D object and interact with the view 908 within the 3D object viewer 917. Viewing options may include rotating the 3D object, tilting the view, panning the view, and zooming in or out. Changing the viewing options may involve using a mouse, cursor, keyboard, touchscreen, pen, stylus, as well as onscreen controls within the UI. The user may also interact with the 3D object by editing parameters, such as by interacting with controls within the parameter editor UI 918. Parameter editing controls may include, but are not limited to: buttons, check boxes, radio buttons, sliders, text boxes, text editors, and any other input capable of accepting information related to 3D object parameters.

In an embodiment, each time the user interacts with the view 908 or manipulates the 3D object parameters and other factors 909 (e.g., changing the material which may require a rendering of the object in the material), each of these actions initiates a request for an image from the 3D object manipulation platform 930. The platform may deliver the requested image in one of several manners as described herein.

User Experience

The inventors have realized that, in some embodiments, an aspect of user interaction with a 3D solid model resident on a 3D object manipulation platform 930 is delivering a seamless user experience while rendering changes to the images associated with the 3D printable object as the 3D object is modified, rotated, and viewed. For example, the user experience may break down at frame rates below ten frames per second; therefore, in order to maintain at least ten frames per second of live rendering, it may be necessary for a 3D object manipulation platform 930 to deliver images responsive to user interaction with the view 908 and user editing of parameters 909 at an average rate of once every 100 milliseconds.

Traditional, client-based solid modeling approaches have delivered user experiences primarily through graphical processing units (GPU), which is dedicated hardware for processing 3D images on a computer. The inventors have recognized that many client computers do not have additional GPU resources, and dedicated graphics processing is also lacking on many low-power mobile devices designed around optimizing battery life. Therefore, the inventors have recognized that an approach may include server-side rendering of images of 3D objects on servers with dedicated GPU resources. The inventors have recognized further that image caching may also improve user experience when manipulating 3D objects. Additionally, the inventors have recognized that server-side rendering of images of 3D printable objects accompanied by caching of some images may utilize a state machine operating within the distributed system.

In various embodiments, many types of user inputs and interactions with the 3D client UI 916, such as requesting a 3D object 905, viewing a 3D object 907, interacting with a view 908, and manipulating the 3D object 909 may resolve into a request for an image from the 3D object manipulation platform 930. In an embodiment, the distributed system 900 maintains the user experience by rendering images on a server within the 3D object manipulation platform 930, caching these images, and by displaying the images of the 3D object to the 3D client UI 916.

In various embodiments, the 3D client UI 916 may access the functions of the 3D object manipulation platform 930 through a scripting language. In one implementation, when requesting images, the 3D client UI 916 may first request a cached image from an API endpoint before requesting the back end server 936 to render an image.

Figure 10:
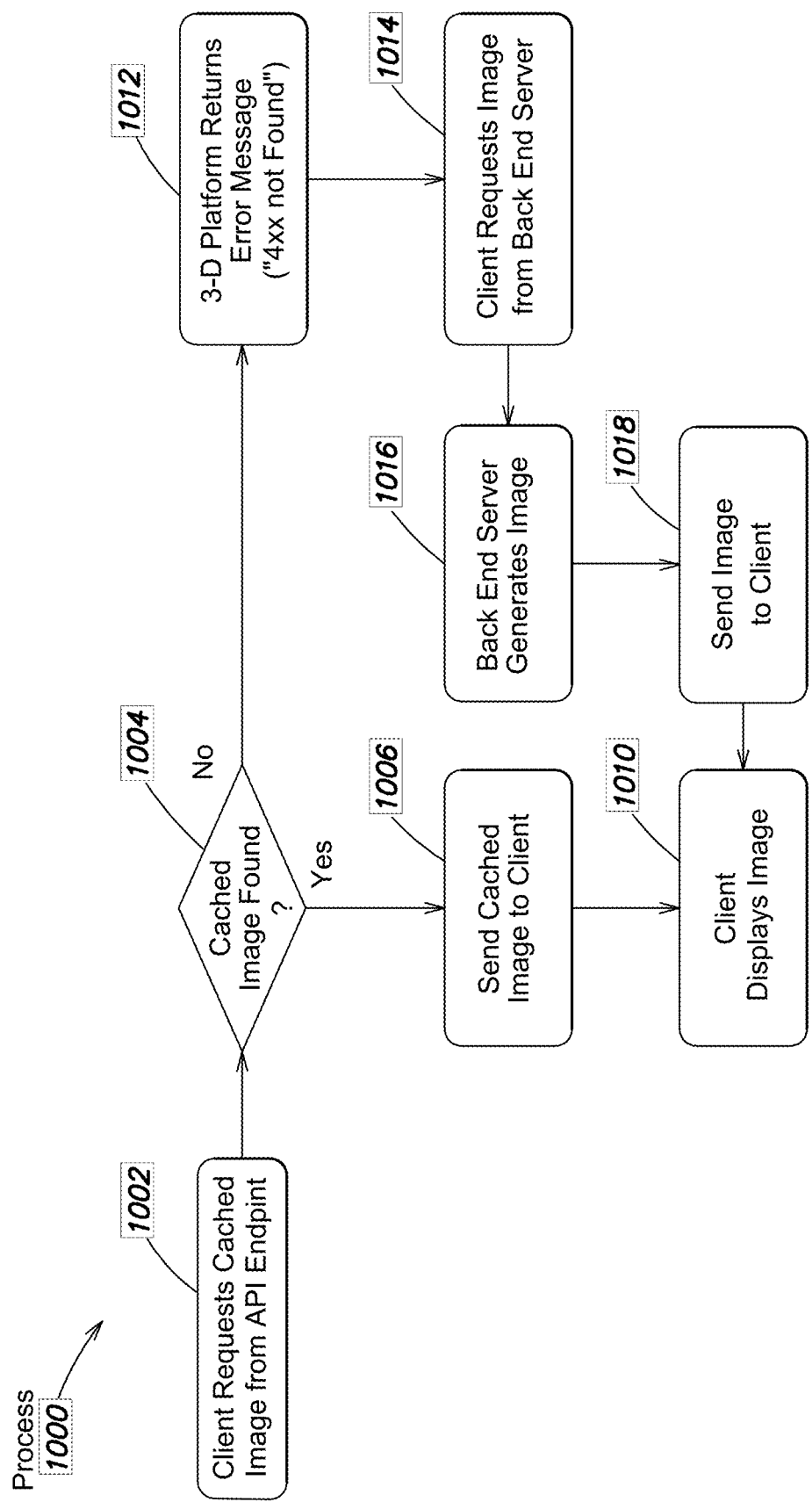
FIG. 10 illustrates an exemplary process for delivering images of a 3D object in accordance with one embodiment of the present disclosure.

FIG. 10 illustrates an exemplary process for requesting images of a 3D printable object from a 3D object manipulation platform. In an embodiment, for any 3D object with which a user interacts, an initial call may request an initial image from the back end server in a manner similar to that described with reference to block 1014, below. However, in an embodiment, once a 3D object has been identified by a user, at block 1002 the process begins with a client requesting a cached image from an API endpoint. In some embodiments, this API endpoint may include one of several HTTP calls, such as POST "updateSceneCached" and GET/POST "makeImageCached" which will be discussed in greater detail below.

At block 1004, the 3D object manipulation platform looks for the cached image of the 3D object. If the 3D platform finds the cached image on a server, the 3D platform may respond with a 200 HTTP code indicating success. At block 1006, the 3D platform sends the cached image to the client, and at block 1010, the client displays the image within the UI, such as the 3D client UI 916 as referenced in FIG. 9, and the process ends.

In an embodiment, if at block 1004, the cached image is not found, at block 1012, the 3D platform returns a HTTP code indicating that the cached image is not found (e.g., a 400 HTTP error code). At 1014, the client requests the image from the back end server, relying on API endpoint calls such as the POST "updateScene" and GET/POST "makeImage" functions. In an embodiment, calls to the back end server may include an identifier that may include information about the user, the 3D object, and the user's session. The calls to the back end server may also include parameters related to the 3D object script. At block 1016, the back end server generates a 2-D raster image of the 3D object responsive to the inputs which may include changes to the view, changes to the parameters, changes to the materials, and so forth. At block 1018, the 3D platform sends the image to the client, and at block 1010, the client displays the image within the UI, and the process ends.

In an embodiment, the process shown in FIG. 10 may continue past block 1010 with the user further interacting with the view, the image, or the parameters, which begins the process again. For example, each user interaction with the view and/or the parameters initiates another request for an image. In an embodiment, the client requests the cached image first and then, if the cached image is not found as indicated by an HTTP 400 error code, the client then requests for the back end server to render an image of the 3D object.

Scripting Language

In an embodiment, users and shop owners may interact with the 3D platform within the distributed system using a scripting language. For example, one such 3D platform includes the ShapeJS system, which includes a server backend that can execute scripts and provide 2-D and 3D images to clients. The 3D platform may include stateful modes to enable lower latency user experiences, but the 3D platform may also be run in a non-stateful manner if desired.

In an embodiment, 3D printable objects may be associated with scripts, and sessions in which a user interacts with a script may be known as a "scene." As discussed herein a scene may be identified by "sceneID" within the scripting language. Also, the related concept of a "job" is discussed herein as identified by the "jobID" identifier within the scripting language.

Figure 11:
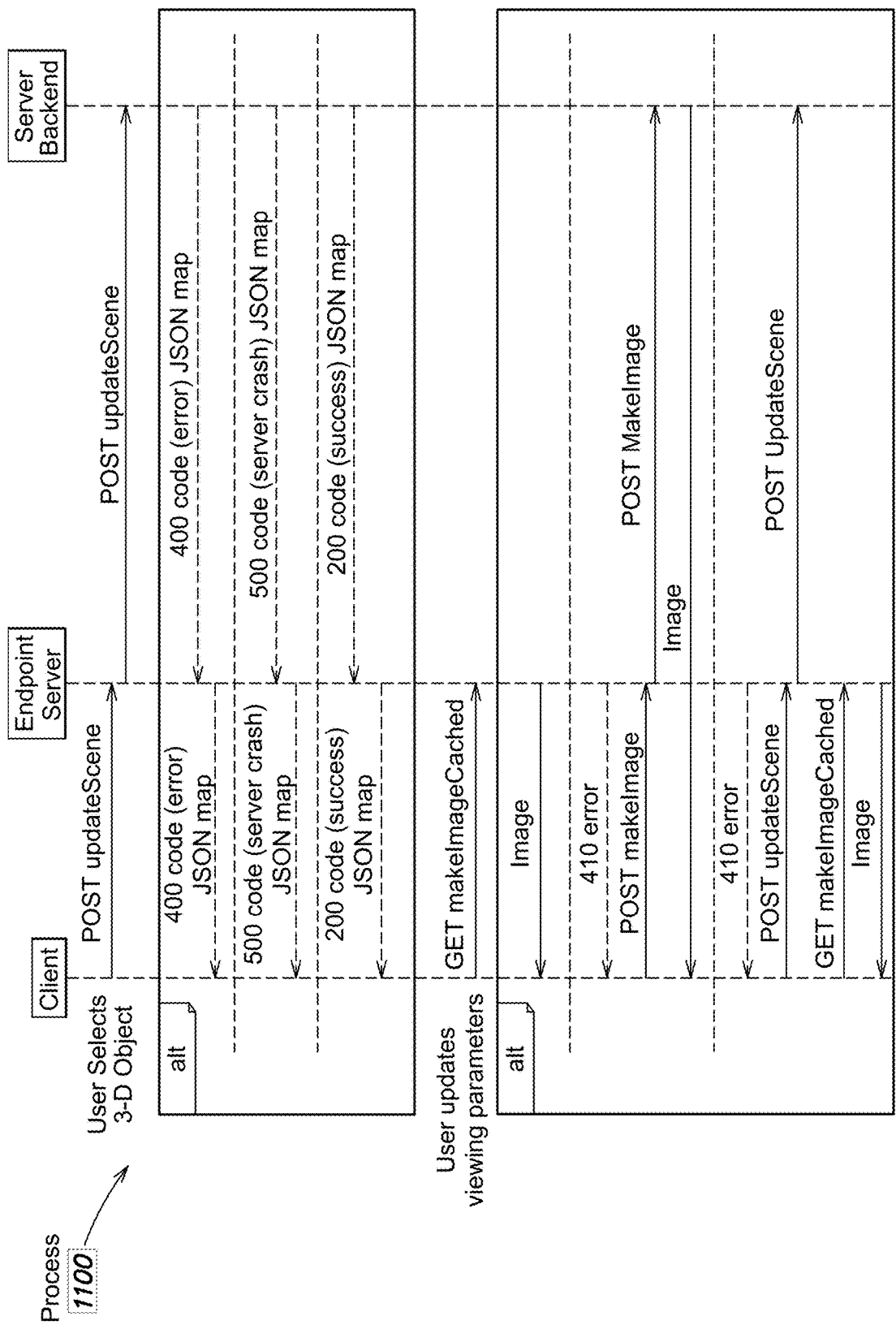
FIG. 11 is an exemplary sequence diagram in accordance with one embodiment of the present disclosure.

In an embodiment, a basic viewing flow begins with a user, as represented by a software client on a device, calling an API endpoint to set a 3D object script and parameter values. The user requests an image of a 3D printable object. According to one embodiment, the object is represented by a 3D object script and parameter values. The 3D object script identifier and the parameter values are arguments that are passed with the API endpoint call. FIG. 11 illustrates a sequence diagram for an embodiment consistent with the present disclosure. In an embodiment, the process 11000 begins with a user selecting a 3D object. Within the scripting language, the client calls POST "updateScene" to the 3D platform. The 3D platform responds with one of several possible HTTP codes. For example, a 400-series code represents an error; a 500-series code represents a server crash; and a 200-series code represents a successful POST operation. All HTTP codes may also return a JavaScript Object Notation (JSON) map. A successful POST "updateScene" may set the script and parameter values associated with the 3D object and will reset the server's representation of the shared scene state.

As shown in FIG. 11, a user may subsequently update the view or modify the 3D object. These actions result in calls to "makeImageCached" with new viewing parameters. The calls to "makeImageCached" may return an image responsive to the new viewing parameters. However, if no such cached image is available (e.g., as represented by a 410 error), the client may do one of two things. First, the client may call POST "makeImage" to the 3D platform and receive an image responsive to the new viewing parameters. Second, the client may initiate a new call to POST "updateScene" to the 3D platform and then call GET "'makeImageCached" to retrieve the image responsive to the new viewing parameters.

In an embodiment, within the scripting language, the computer representation of a 3D printable object may include a script and a set of parameters. The 3D object repository may include an identifier for each script associated with a 3D object. The 3D platform or the user client software may assign a unique identifier for a user. The 3D platform may create one or more identifiers based upon a combination of the user identifier and the script identifier. For example, the "sceneID" may be defined by a hash, such as with the message digest 5 (MD5) algorithm, of the script defining the 3D object plus a unique token for the session. The "sceneID" may not change as script parameters are modified. Another potential identifier is the "jobID" which may include a hash of the script and the user identifier.

In one specific embodiment, cached endpoints have a cache-breaking attribute. Such an attribute may take the form of a "frameNum" to identify a frame number associated with an image. This attribute may be used to break caching schemes. For example, a POST to the "updateScene" API endpoint may change the state of an image without changing the state of the cached image. A user could change a parameter, and the client could update the image with a POST "updateScene" call to an API endpoint. However, without a cache-breaking scheme, such as a "frameNum" attribute, subsequent calls to a "*Cached" API endpoint at a given URL would return a result that would not reflect the changed parameters. Browsers and other web proxies may cache this result which may lead to an image display that does not reflect changed parameters or other characteristics. By assigning a frame number (the "frameNum" attribute) to each cached endpoint, the 3D platform and the client may be able to distinguish between results from the cached endpoints.

In an embodiment, 3D printable objects are represented by a script (associated with a script identifier) and parameters. The parameters may be passed to an API endpoint over HTTP in a variety of manners. In an embodiment, the parameters may be JavaScript Object Notation (JSON) data. In another embodiment, the parameters may be attached multipurpose internet mail extensions (MIME) binary data.

In various embodiments, data is passed to and from API endpoints using uniform resource identifier (URI) data types. In one embodiment, the URI data type may include JSON encoded data in URI form. In another embodiment, the URI data types may include attached MIME data. In yet another embodiment, the URI data type may include a fully qualified uniform resource locator (URL).

In an embodiment, the POST "updateSceneCached" API endpoint may enable a user or client to update a given "scene" or user session associated with a given 3D printable object. Data passed in POST "updateSceneCached" may include delta-encoded parameters and other values in which only the changes to the parameters are passed in the API endpoint call. For example if only two parameters are changed by the user or client, in an embodiment, only those two changed parameters are passed in the POST "updateSceneCached" call, and not the full set of parameters associated with the 3D printable object.

In an embodiment, the POST "makeImage" API endpoint may generate a 2-D raster image for a 3D printable object script and its associated parameters. In some embodiments, "makeImage" may include specific material for rendering the 3D object. In an embodiment, GET/POST "makeImageCached" may generate a 2-D raster image for a cached scene representing a user session interacting with a 3D printable object script and its associated parameters. As discussed above, the call to "makeImageCached" includes a "frameNum" attribute which is a cache-busting marker that is incremented with each frame. If a cached image identified by a "makeImageCached" endpoint call is not available within the 3D platform, the 3D platform returns a 410 error code over HTTP.

In an embodiment, a GET/POST "saveModel" API endpoint call may generate a 3D model for a 3D printable object script and its associated parameters. The model may be saved in X3D or STL format and may be encoded in X3D, X3DB, X3DV, AOPT, binary formats, or any other format. The "saveModel" call may include a script identifier for the 3D printable object and associated parameters. Similarly, a GET/POST "SaveModelCached" API endpoint call may generate a 3D model for a 3D printable object script and its associated parameters. The model may be saved in X3D or STL format and may be encoded in X3D, X3DB, X3DV, AOPT, binary formats or other format. The "saveModel" call may include a script identifier for the 3D printable object, associated parameters, and a cache-busting market such as the "frameNum" attribute. If the script is not cached within the 3D platform, the 3D platform returns a 410 error code over HTTP.

In an embodiment, a call to the POST "pick" API endpoint may cast a ray into a "scene" associated with a 3D printable object and report a 3D position of intersection with the ray. The 3D position may be encoded in JSON format. The "pick" call may include a script identifier for the 3D printable object and associated parameters. Similarly, a call to the GET/POST "pickCached" may cast a ray into a "scene" associated with a 3D printable object and report a 3D position of intersection with the ray in JSON format. The "pickCached" call may include a script identifier for the 3D printable object, associated parameters, and a cache-busting market such as the "frameNum" attribute. If the script is not cached within the 3D platform, the 3D platform returns a 410 error code over HTTP.

In an embodiment, a call to the GET/POST "rayPick" API endpoint may intersect a list of rays into the scene representing the 3D printable object and its associated parameters. In addition to identifying the 3D printable object and parameters, a call to "rayPick" also includes an array of starting points and an array of directions. The call to the "rayPick" endpoint may return the 3D position of intersection for each of the rays in a JSON-encoded map with two array fields: point and normal. For a given ray, a point of (−10000, −10000, −10000) indicates that the ray did not intersect anything within the 3D printable object.

In an embodiment, a call to the GET/POST "saveSceneCached" API endpoint may generate a ZIP stream of the script and all of its parameters. The call to "saveSceneCached" may resolve a local URI as a fully qualified URL which may then be placed in the ZIP. The "saveSceneCached" endpoint may be implemented as a representational state transfer (REST) service so the 3D platform may access local files and combine them into a single ZIP file. The ZIP file may contain the script associated with the 3D printable object, a JSON object of the parameters and values, and any files referenced by URI parameters (e.g., models, images, etc). In an embodiment a call to the POST "loadScene" API endpoint may load a saved scene into the client. The "loadScene" endpoint may be implemented as a REST service so the 3D platform may read local files into the browser. In one embodiment, all URI parameters may be available in a public directory for a brief time.

In an embodiment, a call to the GET "load" API endpoint may request the current load averages with the 3D platform and may return a JSON-encoded map with fields including: the number of devices, the one minute load average, the five minute load average, and data. In an embodiment, a call to the GET/POST "evalParams" API endpoint may evaluate a 3D printable object script for its parameters. The call may include a script identifier and it may return a JSON object map of the parameter definitions. In an embodiment, a call to the GET/POST "getSceneStats" API endpoint may include a "jobID" to identify a specific 3D printable object script and user. The call to "getSceneStats" may return a JSON-encoded map of the "scene" and rendering statistics for the 3D printable object.

In an embodiment, a call to the GET/POST "calculatePriceCached" API endpoint may calculate the price a printed 3D object will cost at a 3D printing service bureau, such as a service bureau associated with Shapeways 3D printing service located at http://www.shapeways.com. The "calculatePriceCached" call may include: a "jobID" to identify a specific 3D printable object script and user; a material identifier, such as "materialID"; a boolean value to identify whether the desired pricing is to be an estimate or an exact price; and the number of parts to use in the estimate. The "calculatePriceCached" call may return a JSON-encoded map with pricing information. In an embodiment, a call to the GET/POST "releaseJob" API endpoint may release the 3D platform resources (e.g., servers and storage) associated with a specific job as identified by "jobID." The "releaseJob" endpoint may be optional, and it may be used to increase server performance by freeing resources.

In an embodiment, a call to the GET/POST "getNumRegionsCached" API endpoint may calculate the number of separate regions in a given scene. The "genNumRegionsCached" call may include a job identifier; a boolean value to determine whether to generate a visualization of the separate regions; and the voxel size to use for the analysis. A call to "getNumRegionsCached" may return a JSON-encoded map identifying success or failure of the operation as well as outputs including: the integer count of the number of regions; the volume in cubic meters of the largest region; and the voxel size used for analysis.

In an embodiment, a call to the GET/POST "checkScriptPrintabilityCached" API endpoint may calculate all printability checks of a given script. The "checkScriptPrintabilityCached" call may include a job identifier and a boolean value to identify whether or not to generate visualizations for the tests. The results from a "checkScriptPrintabilityCached" call may be returned in a JSON-encoded list of test results, with each test result being its own object, the results including: the number of regions checked, the number of regions in the design, the result of the test (e.g., a boolean value identifying success or failure); voxel size; number of regions tested; the largest region; connected parts check; messages; error levels; and job identifier.

In an embodiment, a call to the GET/POST "checkPrintabilityCached" API endpoint may calculate specified printability checks in a material. The "checkPrintabilityCached" call may include a job identifier, a list of checks to perform, and a material group to check against. The checks may include wall thickness, loose shells, and boundaries. The results from a "checkPrintabilityCached" call call may be returned in a JSON-encoded list of test results, with each test result being its own object, the results including: the test name; test description; the result of the test (e.g., a boolean value identifying success or failure); voxel size; number of regions tested; the largest region; connected parts check; messages; error levels; and job identifier. In an embodiment, a call to the GET "getPrintabilityChecks" API endpoint may return a JSON-encoded list of printability checks available, such as wall thickness and loose shells.

In an embodiment, a "scene" for a 3D printable object includes a "data source" and/or a "bound." A "data source" is a function which calculates the distance to the surface of the 3D printable object. For example, a "data source" for a cube may be a function which calculates the distance to surface of the cube. A "bound" specifies the area in which the scripting language may endeavor to display the 3D printable object. For example, a "bound" for a cube may be a box defined as Bounds(X minimum, X maximum, Y minimum, Y maximum, Z minimum, Z maximum), where X, Y, and Z are the coordinate axes in three dimensions. In some embodiments, these distances are relative to the center of the 3D printable object, defined as (0,0,0) and sometimes called the "origin". The "origin" may be defined to be the center of the "scene" and/or the center for one or more "data sources." In an example, if the "data source" being viewed, e.g., a cube, is cut off at its edges, a "bound" for the "scene" may be enlarged to include the cut off edges. However, if the "bound" is enlarged to an extent where the voxel resolution is decreased, the 3D printable object may appear pixelated and be a less accurate representation of the object.

In an embodiment, a "scene" for a 3D printable object includes a "primitive." A "primitive" is a function for producing a basic shape, such as a vector, a sphere, a box, a cylinder, a cone, a torus, or a another suitable shape. These shapes may form the basis for more complex shapes for the 3D printable object. The "scene" may optionally include a "transform" to translate (or move), rotate, scale, or twist the 3D printable object. The translate "transform" may be used to move an object by applying a 3D vector to it. The scale "transform" may be used to resize (uniform scale) or distort (non-uniform scale) an object as desired. The rotate "transform" may be used to turn an object around a specific axis. For example, an object having a torus shape typically starts out facing a specific direction and may be turned around a user specified axis to have the object face the desired direction. The rotation center may be the "origin," as described above, or another suitable rotation center. The twist "transform" may be used to perform a twist of space via rotation around about the z-axis. In order to perform multiple "transforms," a user may create a composite "transform" including one or more "transforms" the user wishes to apply to the object. Ins some embodiments, the order in which the individual transforms are added to the composite "transform" is the order in which they are carried out. In such a case, changing the order may create radically different end results. For example, to have a twisted torus object still end up facing along the z-axis, the object may be rotated, twisted, and then rotated back to its original orientation, with the twist still intact. However, if the torus object were twisted before the first rotation, there will be no visible twist on the object.

As discussed above, the inventors have recognized that a problem to be solved is to present 3D printable object information to consumers, to give those consumers the ability to manipulate and modify 3D printable objects, and to enable those consumers to purchase and print modified 3D objects. Accordingly, the described systems and methods provide for a novel means of modifying objects using Boolean functions provided in a 3D platform such as the ShapeJS system.

Figure 12:
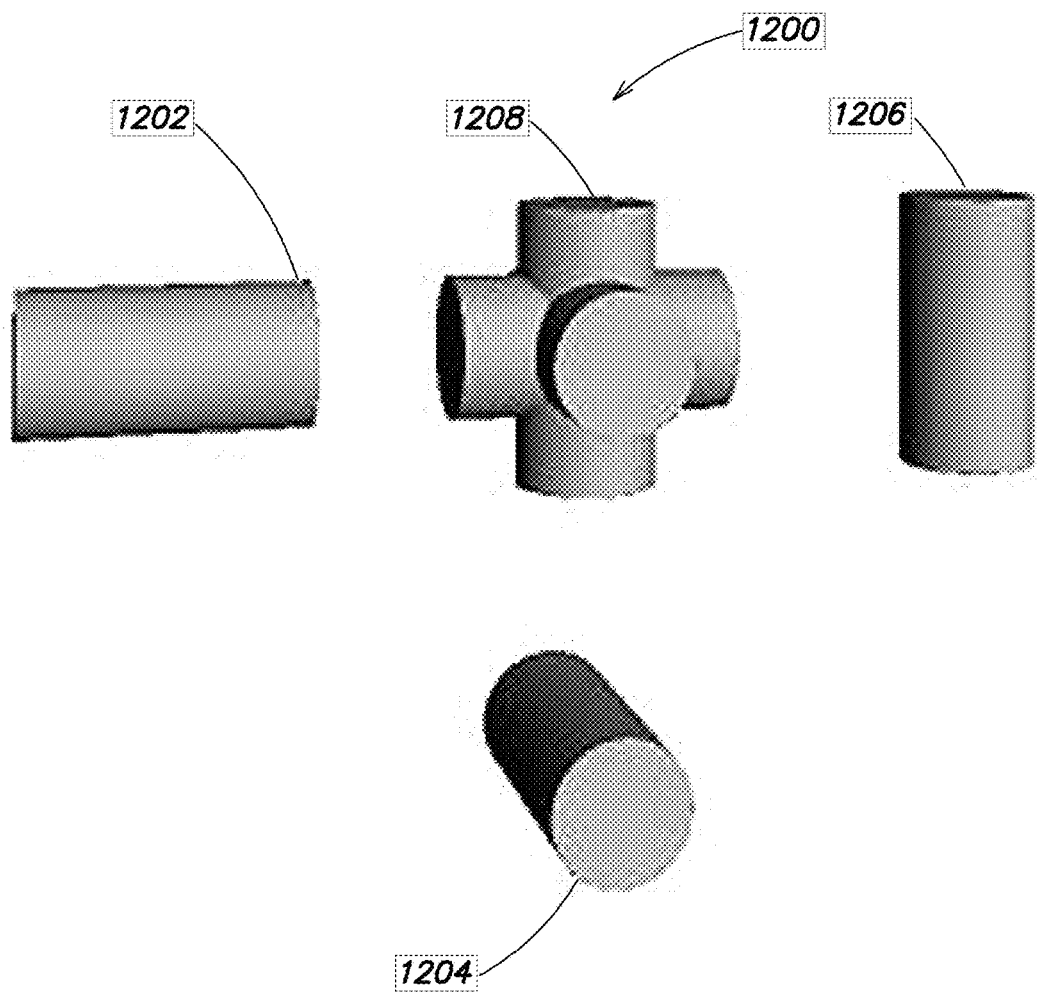
FIG. 12 illustrates an exemplary application of a "union" function to multiple 3D objects in accordance with one embodiment of the present disclosure.
Figure 13:
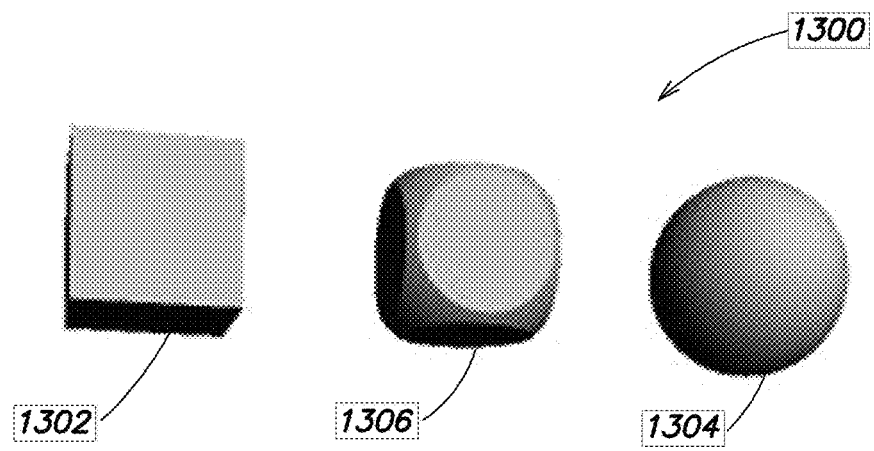
FIG. 13 illustrates an exemplary application of an "intersection" function to multiple 3D objects in accordance with one embodiment of the present disclosure.
Figure 14:
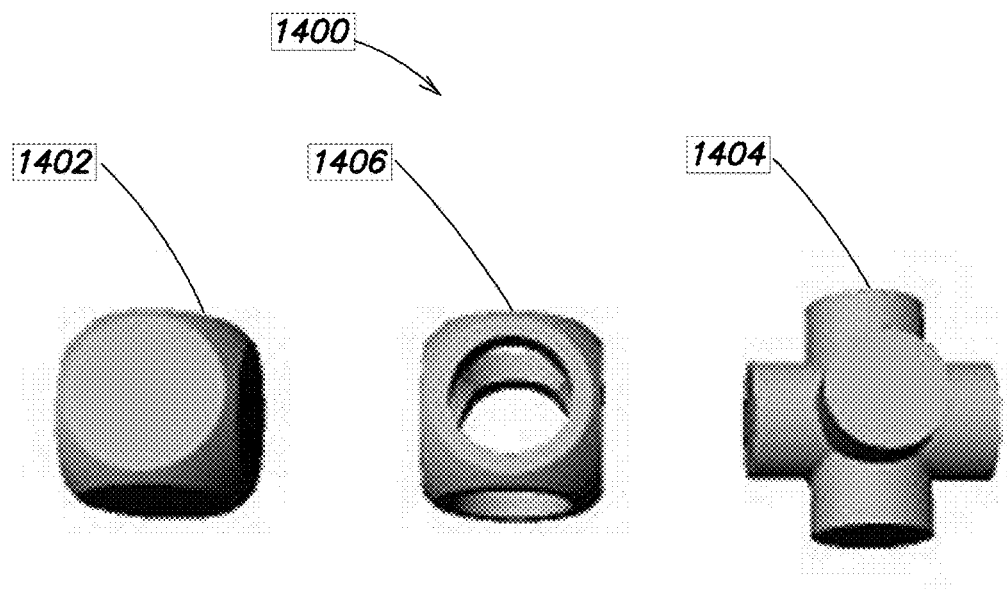
FIG. 14 illustrates an exemplary application of a "subtraction" function to multiple 3D objects in accordance with one embodiment of the present disclosure.

In an embodiment, a "scene" for a 3D printable object includes one or more Boolean functions. The Boolean functions may be used to modify and/or combine 3D printable objects. The Boolean functions allow for a method of modeling known as solid modeling, which is illustrated in FIGS. 12-14. The Boolean functions include, but are not limited to, a "union" function, an "intersection" function, a "subtraction" function, a "complement" function, and a "blend" function.

In an embodiment, a "union" function applied to two or more objects takes the objects and combines them into a single combined object. This allows a user to display or transform the combined object in the same way as any of the individual objects. FIG. 12 shows an illustrative example 1200 of a "union" function applied to three cylinders 1202, 1204, and 1206 to create a modified object 1208. The "union" function may be applied to objects even if they do not intersect with one another. For example, if a user wishes to create and display a "scene" with multiple parts, they may do so using the "union" function.

In an embodiment, the "union" function is implemented on a 3D platform, such as the ShapeJS system, which includes a server backend that can execute scripts and provide 2D and 3D images to client devices. For example, a basic viewing flow may begin with a user, as represented by a software client on a device, calling an API endpoint to set a 3D object script and parameter values for two 3D objects. The software client may include a presentation interface having a control interface, for the user to interact and/or modify with the 3D objects, and a display interface, for the user to view the 3D objects. The user may interact with the control interface of the software client to modify the 3D objects by performing a union of the 3D objects. As described with respect to FIG. 11, these actions may result in calls to "makeImageCached" with new viewing parameters. The calls to "makeImageCached" may return an image responsive to the new viewing parameters. On receiving the "makeImageCached" call, the server of the 3D platform may obtain, e.g., from the new viewing parameters, information relating to the two objects (e.g., mathematical representations of each object, 3D object script and parameter values, etc.), the specified "union" function, and/or other suitable information. The server may combine the two objects according to the "union" function and generate information relating to the combined object (e.g., mathematical representations of each object, 3D object script and parameter values, etc.). The server may render an image of the combined object based on the generated information for the combined object and return the image for display in the display interface of the software client.

In an embodiment, an "intersection" function applied to two or more objects may result in a single combined object that is comprised only of the area in which all the individual objects overlap. An "intersection" function may be used to create non-standard shapes. For example, five planes may be input into an "intersection" function to create an inverted pyramid shape. FIG. 13 shows an illustrative example 1300 of an "intersection" function applied to a box 1302 and a sphere 1304 so as to keep only the parts of the box 1302 and the sphere 1304 which overlap to create a modified object 1306.

In an embodiment, the "intersection" function is implemented on a 3D platform, such as the ShapeJS system. For example, a basic viewing flow may begin with a user, as represented by a software client on a device, calling an API endpoint to set a 3D object script and parameter values for two 3D objects. The user may interact with the control interface of the software client to modify the 3D objects by performing an intersection of the 3D objects. As described with respect to FIG. 11, these actions may result in calls to "makeImageCached" with new viewing parameters. The calls to "makeImageCached" may return an image responsive to the new viewing parameters. On receiving the "makeImageCached" call, the server of the 3D platform may obtain, e.g., from the new viewing parameters, information relating to the two objects (e.g., mathematical representations of each object, 3D object script and parameter values, etc.), the specified "intersection" function, and/or other suitable information. The server may combine the two objects according to the "intersection" function such that the resulting object is comprised only of the area in which the two objects overlap. The server may generate information relating to the resulting object (e.g., mathematical representations of each object, 3D object script and parameter values, etc.). The server may render an image of the resulting object based on the generated information for the resulting object and return the image for display in the display interface of the software client.

In an embodiment, a "subtraction" function applied to two objects treats the second object as a negative and removes everything it overlaps on the first object. FIG. 14 shows an illustrative example 1400 of a subtraction function applied to an object 1402 (similar to the rounded box object 1306) and an object 1404 (similar to the combined cylinder object 1208) where object 1404 is taken out of object 1402 to create a modified object 1406. In some embodiments, where more than two objects are in consideration, a "subtraction" function may not be applied because it only takes two objects as input. In such a case, the "subtraction" function may be applied to the objects taken two a time. Alternatively, a "union" function may applied to the objects to be removed and used as the second object in the "subtraction" function. FIG. 14 illustrates this approach. Object 1404 is a "union" of three cylinders that is removed from the object 1402. If the "union" function were not applied to the three cylinders, a user would need to subtract each cylinder from the object 1402 to create object 1406.

In an embodiment, the "subtraction" function is implemented on a 3D platform, such as the ShapeJS system. For example, a basic viewing flow may begin with a user, as represented by a software client on a device, calling an API endpoint to set a 3D object script and parameter values for two 3D objects. The user may interact with the control interface of the software client to modify the 3D objects by performing a subtraction of the 3D objects. As described with respect to FIG. 11, these actions may result in calls to "makeImageCached" with new viewing parameters. The calls to "makeImageCached" may return an image responsive to the new viewing parameters. On receiving the "makeImageCached" call, the server of the 3D platform may obtain, e.g., from the new viewing parameters, information relating to the two objects (e.g., mathematical representations of each object, 3D object script and parameter values, etc.), the specified "subtraction" function, and/or other suitable information. The server may combine the two objects according to the "subtraction" function such that the resulting object excludes a portion from the second object that overlaps the first object. The server may generate information relating to the resulting object (e.g., mathematical representations of each object, 3D object script and parameter values, etc.). The server may render an image of the resulting object based on the generated information for the resulting object and return the image for display in the display interface of the software client.

In an embodiment, a "complement" function applied to an object may create the entire bounding box excluding the object being input to the "complement" function. In an embodiment, when performing Boolean operations that create one or more sharp edges, a "blend" function may be applied to add smoothing to the sharp edges of the object resulting from the Boolean operations. Both the "complement" and "blend" functions may be implemented on a 3D platform, such as the ShapeJS system, in a manner similar to that described above with respect to the "union," "intersection," and "subtraction" functions.

In an embodiment, a volume pattern may be applied to a 3D printable object to modify the object. In some embodiments, a volume pattern may fill the entire "scene" and stop only when the pattern runs into the bounding box. In order to avoid this from happening, one or more Boolean functions may be used to limit the size of the resulting object. One way the volume pattern may be applied to a 3D printable object is to input the volume pattern and the 3D printable object to a volume pattern function. Alternatively, the volume pattern may be applied to the 3D printable object using an "intersection" function (or a "subtraction" function). This approach may be useful in hollowing out objects, so as to use less material and come up with something that will ultimately be cheaper to print. However, being able to model something does not necessarily mean that it can be safely printed. The resulting object may need to be analyzed to determine if parts of it have become disconnected or extremely thin. To address this issue, while still using the intended volume pattern, a thickness parameter may be adjusted in order to create a less fragile piece while still keeping the desired volume pattern. The repetition of the volume pattern may also be altered to create the desired look for the resulting object. The described volume pattern functionality may be implemented on a 3D platform, such as the ShapeJS system, in a manner similar to that described above with respect to the "union," "intersection," and "subtraction" functions.

The inventors have recognized that the ability to emboss and engrave text and images is incredibly useful for customization of 3D printable objects. Accordingly, the described systems and methods provide for a novel means of applying an embossing and/or engraving to a 3D printable object using a 3D platform, such as the ShapeJS system. In an embodiment, a user may apply embossing or engraving of patterns, text, images, or another suitable customization to a 3D printable object. Instead of applying a pattern using an "intersection" or "subtraction" function resulting in an object that may not be safely printable, as discussed above, the pattern may be applied using an "embossing" function. The "embossing" function may allow a user to control how much detail is added, how deep the pattern goes and/or how far out the pattern and easily make sure the resulting object is safely printable.

Figure 15:
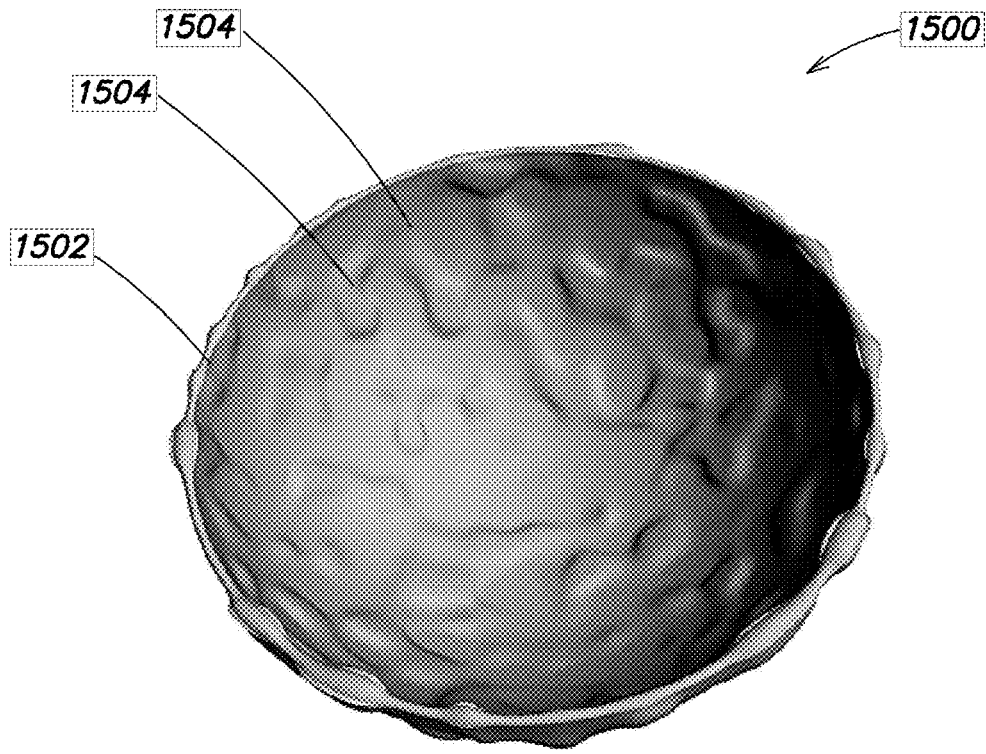
FIG. 15 illustrates an exemplary application of an "embossing" function to emboss a pattern on a 3D object in accordance with one embodiment of the present disclosure.

In an embodiment, the "embossing" function may allow a user to emboss an object by adding material to the object, e.g., a bowl, according to another object, e.g., a pattern. It is different from a Boolean function, however, in that it allows the user to control the minimum and maximum height resulting from the process. In some embodiments, because embossing adds volume to the object, the bounds of the "scene" may need to be enlarged to accommodate the embossing, depending on how thick an embossing is desired. FIG. 15 shows an illustrative example 1500 of an embossing pattern 1504 applied to a bowl 1502. In the illustrative example 1500, material is added to the bowl 1502 according to the pattern 1504 and the minimum and maximum values applied using the "embossing" function.

In an embodiment, the "embossing" function to emboss a pattern on an object is implemented on a 3D platform, such as the ShapeJS system. For example, a basic viewing flow may begin with a user, as represented by a software client on a device, calling an API endpoint to set a 3D object script and parameter values for a 3D object. The user may interact with the control interface of the software client to modify the 3D object by embossing a pattern on the 3D object using the "embossing" function. As described with respect to FIG. 11, these actions may result in calls to "makeImageCached" with new viewing parameters. The calls to "makeImageCached" may return an image responsive to the new viewing parameters. On receiving the "makeImageCached" call, the server of the 3D platform may obtain, e.g., from the new viewing parameters, information relating to the object and the pattern (e.g., mathematical representations, 3D object script and parameter values, etc.), the specified "embossing" function and related minimum and maximum values, and/or other suitable information. The server may emboss the pattern on the 3D object according to the minimum value (e.g., zero) and the maximum value (e.g., 5 mm) to generate an embossed 3D object. The server may generate information relating to the embossed 3D object (e.g., mathematical representations, 3D object script and parameter values, etc.). The server may render an image of the embossed 3D object based on the generated information for the embossed 3D object and return the image for display in the display interface of the software client.

Figure 16:
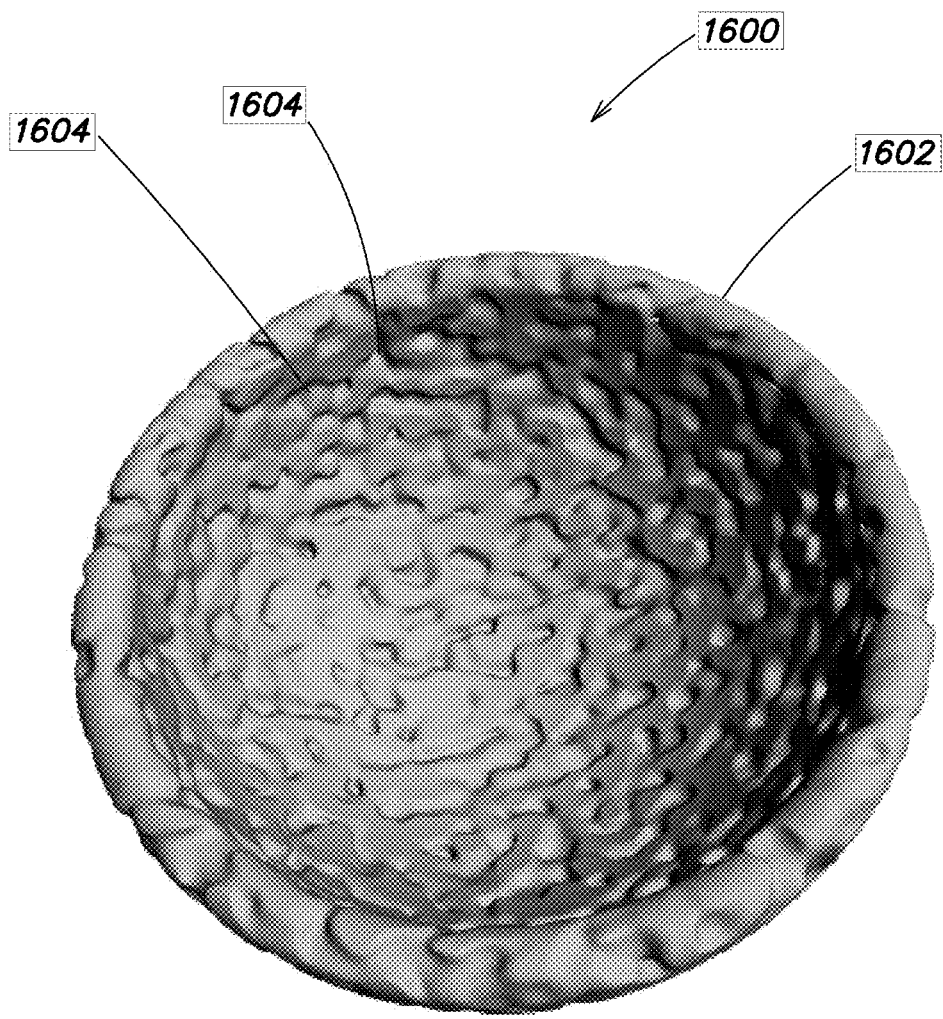
FIG. 16 illustrates an exemplary application of an "embossing" function to engrave a pattern on a 3D object in accordance with one embodiment of the present disclosure.

In an embodiment, the "embossing" function may be used to engrave an object, e.g., a bowl, according to another object, e.g., a pattern, by setting a minimum value of the "embossing" function to negative (instead of zero for embossing the object). Optionally, the maximum value may be set to zero or another suitable value to accommodate the pattern chosen for engraving. In the example of the pattern being engraved on the bowl, rather than adding material to the bowl according to the pattern, material is removed from the bowl according to the pattern. FIG. 16 shows an illustrative example 1600 of an engraving pattern 1604 applied to a bowl 1602. In the illustrative example 1600, material is removed from the bowl 1602 according to the pattern 1604 and the negative minimum value applied using the "embossing" function. If the minimum value is set to be a large negative value in comparison to the thickness of the object, the engraving may be too deep inside the object. For example, for an object such as a bracelet, a large negative value may result in partially engraving the far side of the bracelet even if that is not desired. In another example, if the engraving pattern look like a letter "R" with an encircled section, that piece would be loose in the printed object and likely lost as a result. In some embodiments, even if the minimum value is set such that the engraving does not go all the way through the object, the engraving may impact the wall thickness depending on the minimum thickness for the material being used for printing the object.

In an embodiment, the "embossing" function to engrave a pattern on an object is implemented on a 3D platform, such as the ShapeJS system. For example, a basic viewing flow may begin with a user, as represented by a software client on a device, calling an API endpoint to set a 3D object script and parameter values for a 3D object. The user may interact with the control interface of the software client to modify the 3D object by engraving a pattern on the 3D object using the "embossing" function. As described with respect to FIG. 11, these actions may result in calls to "makeImageCached" with new viewing parameters. The calls to "makeImageCached" may return an image responsive to the new viewing parameters. On receiving the "makeImageCached" call, the server of the 3D platform may obtain, e.g., from the new viewing parameters, information relating to the object and the pattern (e.g., mathematical representations, 3D object script and parameter values, etc.), the specified "embossing" function and related minimum and maximum values, and/or other suitable information. The server may engrave the pattern on the 3D object according to the minimum value (e.g., −5 mm) and the maximum value (e.g., zero) to generate an engraved 3D object. The server may generate information relating to the engraved 3D object (e.g., mathematical representations, 3D object script and parameter values, etc.). The server may render an image of the engraved 3D object based on the generated information for the engraved 3D object and return the image for display in the display interface of the software client.

In an embodiment, using the "embossing" function to engrave an object may have a limiter applied on the engraving depth, i.e., the minimum value, to ensure that the walls of the printed object are not too thin as a result of the engraving. For example, a 2 mm limiter may be applied for an object targeted to print in plastic. However, a 3-15 mm limiter may be applied to the object if it is targeted to print in porcelain. In addition, a base may be added to the porcelain object for stability. In another example, if a user uses the "embossing" function to add relatively small embossed or engraved pattern, the thickness of the applied pattern may need to be set such that the pattern would show even after a glaze is applied. In a situation where multiple materials are being used to create the object, different rules for the minimum value may be applicable depending on the material of the part of the object being embossed or engraved.

In an embodiment, the "embossing" function may be used to apply both embossing and engraving to an object according to another object, e.g., a pattern, by setting a minimum value of the "embossing" function to negative (instead of zero for only embossing the object) and by setting a maximum value of the "embossing" function to positive (instead of zero for only engraving the object). In the example of the pattern being applied on the bowl, material may be added according to the pattern to (or embossed on) a first portion the bowl, following the specified maximum value, and material may be removed according to the pattern from (or engraved on) a second portion of the bowl, following the specified minimum value.

Exemplary General Purpose Computer System

Various embodiments according to the present invention may be implemented on one or more computer systems. These computer systems may be, for example, general-purpose computers such as those based on the Intel Core® processor, Apple "A" Series processors, AMD Athlon and A-Series processors, Qualcommm Snapdragon, processors, or any other type of processor. It should be appreciated that one or more of any type computer system may be used to determine ad placement according to various embodiments of the invention. Further, the system may be located on a single computer or may be distributed among a plurality of computers attached by a communications network.

A general-purpose computer system according to one embodiment of the invention is configured to perform any of the described functions, including but not limited to, observing user interactions within a distributed computer system, displaying a graphical user interface to the user of a distributed computer system, presenting web pages to visitors of a publisher or third-party publisher website, receiving content requests, receiving controls from user interactions with a graphical user interface, searching for content, deciding whether to request landing page content, selecting third-parties from which to request landing page content, receiving landing page content, assembling landing page content, and presenting landing page content to an interface. It should be appreciated that the system may perform other functions, including, but not limited to, storing and/or managing the historical behavior of users, monitoring the conversion of return users, maintaining a database of third-party publishers, maintaining a database of landing page inventors, maintaining a database of landing page bid requests, etc., and it should also be appreciated that the invention is not limited to having any particular function or set of functions.

Figure 17:
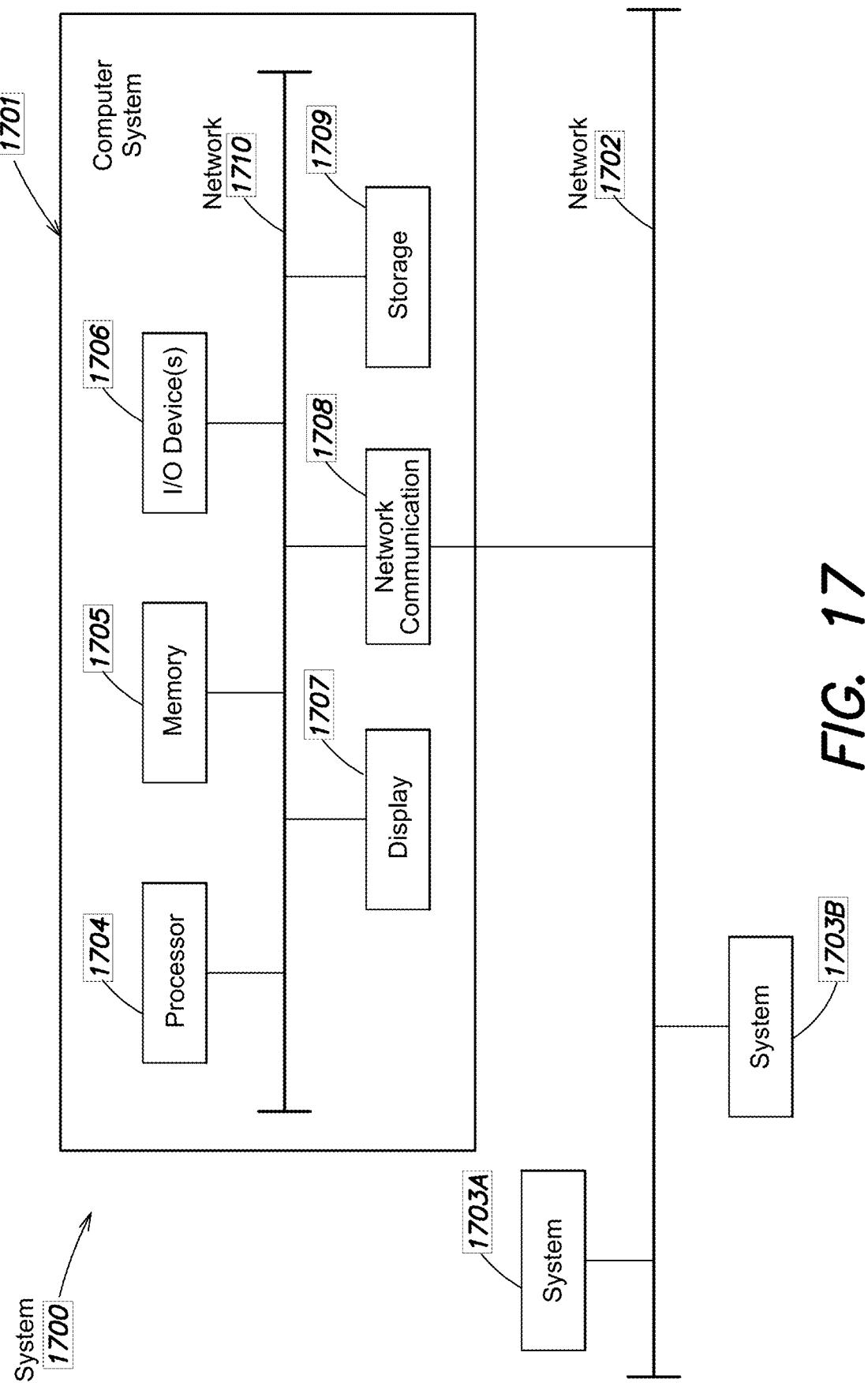
FIG. 17 is an exemplary system diagram in accordance with one embodiment of the present disclosure.

FIG. 17 shows a block diagram of a general purpose computer and network system 1700 in which various aspects of the present invention may be practiced. For example, various aspects of the invention may be implemented as specialized software executing in one or more computer systems including general-purpose computer system 1701 shown in FIG. 17. Computer system 1701 may include a processor 1704 connected to one or more memory devices 1705, such as a disk drive, memory, or other device for storing data. Memory 1705 is typically used for storing programs and data during operation of the computer system 1701. Components of computer system 1701 may be coupled by an interconnection mechanism such as network 1710, which may include one or more busses (e.g., between components that are integrated within a same machine) and/or a network (e.g., between components that reside on separate discrete machines). The interconnection mechanism enables communications (e.g., data, instructions) to be exchanged between system components of system 1701.

Computer system 1701 also includes one or more input/output (I/O) devices 1706, for example, a keyboard, mouse, trackball, microphone, touch screen, a printing device, display screen, speaker, etc. In addition, computer system 1701 may contain one or more interfaces (e.g., network communication device 1708) that connect computer system 1701 to a communication network (in addition or as an alternative to the network 1710).

Storage system 1709 typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 1709, as shown, or in memory system 1705. The processor 1704 generally manipulates the data within the integrated circuit memory 1704, and then copies the data to the medium associated with storage 1709 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1701 is shown by way of example as one type of computer system upon which various aspects of the invention may be practiced, it should be appreciated that aspects of the invention are not limited to being implemented on the computer system as shown in FIG. 17. Various aspects of the invention may be practiced on one or more computers having a different architectures or components than that shown in FIG. 17.

Computer system 1701 may be a general-purpose computer system that is programmable using a high-level computer programming language. Computer system 1701 may be also implemented using specially programmed, special purpose hardware. In computer system 1701, processor 1704 is typically a commercially-available processor such as the well-known Core® series processor available from the Intel Corporation, although many other processors are available. Such a processor usually executes an operating system which may be, for example, the Android mobile operating system available from Google, Inc., the iOS mobile operating system available from Apple Computer, various Windows-based operating systems available from the Microsoft Corporation, the MAC OS operating system available from Apple Computer, or one or more of the Linux-based operating system distributions (e.g., the Enterprise Linux operating system available from Red Hat Inc.) available from various sources. It should be understood that the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. By way of further example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C # (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 1700. For instance, the system may be a distributed system (e.g., client server, multi-tier system). In one example, the system includes software processes executing on a system associated with a user (e.g., a client system). These systems may permit the user to determine a user's context and/or intent as expressed within an ecommerce site, and to provide advertisements from other ecommerce sites, and to display them to the user.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

For example, methods and systems may be provided for presenting the Creator tool to a user. Once the user has the Creator tool, the system provides the user with a range of basic features of modifying parameters, viewing the object, viewing pricing, viewing material choices, viewing printing options, rendering in specific materials, and sending to print or downloading a file (STL or X3D). The Creator is a combination of the Parameter Editor UI and the IP Safe Viewer. Also, a server-focused activity is provided for presenting a GUI to the user. The GUI includes a display and a set of controls (the Parameter Editor UI). Here, the user is passing the first updateScene endpoint call identifying (1) the script identifier, and (2) the parameter values. The server passes these along, gets the image, and passes that to the client. The endpoint URIs, in one implementation, resolve to the first server, and the ShapeJS server backend resolves to the second server. A creator, in one example, includes the Parameter Editor UI and the IP Safe Viewer. This adds in the constraint that the image passed to the client is not the file itself. Also, servers may be provided that present a GUI to the user. Here, the user is passing the first updateScene endpoint call identifying (1) the script identifier, and (2) the parameter values. The server passes these along, gets the image, and passes that to the client.

What is claimed is:

1. A computer implemented method comprising acts of:
receiving, at a first server, from a first user a presentation interface and a computer representation of a three-dimensional object stored in a 3D printable object file comprising at least one script and a set of parameter values;
providing, by the first server, to a second user interacting with a display of a client computer in a distributed computer system, the presentation interface including a display interface configured to display an image relating to the computer representation of the three-dimensional object and a control interface configured to accept inputs capable of modifying the at least one script associated with the three-dimensional object, and wherein the computer representation of the three-dimensional object stored in the 3D printable object file comprising the at least one script and the set of parameter values is not provided to the second user;
receiving, at the first server, from the second user interacting with the presentation interface, a request for the image based on modifying the at least one script relating to the computer representation of the three-dimensional object, wherein the request includes an object identifier and at least one or more user inputs from the group comprising: parameter values, attributes, uniform resource identifiers, cache busting markers, material identifiers, and three-dimensional ray values, wherein the object identifier and the at least one or more user inputs are applied to the at least one script relating to the computer representation of the three-dimensional object;
requesting, from a second server in the distributed computer system, the image relating to the computer representation of the three-dimensional object, wherein the image is generated based on a modified at least one script relating to the computer representation of the three-dimensional object;
receiving the image from the second server; and
displaying, by the first server, the image within the presentation interface.

2. The method of claim 1, wherein the 3D printable object file is different from the image.

3. The method of claim 2, wherein the image comprises a rasterized two-dimensional file.

4. The method of claim 2, wherein the image comprises a static three-dimensional file.

5. The method of claim 1, further comprising acts of:
receiving, at the first server, from the second user interacting with the control interface, instructions to modify the at least one script associated with the computer representation of the three-dimensional object;
requesting, from the second server, responsive to the instructions, an updated image relating to the computer representation of the three-dimensional object, wherein the updated image reflects a modified computer representation of the three-dimensional object responsive to the modified at least one script;
receiving, from the second server, the updated image; and
displaying, by the first server, the updated image within the presentation interface.

6. The method of claim 1, further comprising acts of:
receiving, at the first server, from the second user interacting with the control interface, instructions to modify the at least one script associated with the computer representation of the three-dimensional object;
identifying on the first server, an updated image relating to the computer representation of the three-dimensional object, wherein the updated image reflects a modified computer representation of the three-dimensional object responsive to the modified at least one script; and
displaying, by the first server, the updated image within the presentation interface.

7. The method of claim 1, further comprising acts of:
receiving, from the second user, a request to render the computer representation of the three-dimensional object in a specific material;
requesting, from the second server, the image representing the rendering of the three-dimensional object in the specific material;
receiving, from the second server, the image relating to the three-dimensional object rendered in the specific material; and
displaying the image to the second user within the presentation interface.

8. The method of claim 7, further comprising acts of:
receiving, from the second user, a request to download a file containing an electronic representation of the three-dimensional object;
generating the file from the at least one script and the set of parameter values,
wherein the file is a single computer file that is distinct from the at least one script and the set of parameter values; and
presenting the file to the second user within the presentation interface.

9. The method of claim 8, wherein the file includes an electronic file format selected from the group comprising: STL and X3D.

10. The method of claim 7, further comprising acts of:
calculating a price for printing the three-dimensional object in the specific material; and
presenting the price to the second user within the presentation interface.

11. The method of claim 7, further comprising acts of:
selecting one or more printers for the three-dimensional object;
presenting the one or more printers to the second user;
receiving an input from the second user selecting a printer from the one or more printers;
generating a file containing an electronic representation of the three-dimensional object; and
sending the file to the printer.

12. A distributed computer system comprising a first server, a second server, and a client component configured to:
receive, at the first server, from a first user a presentation interface and a computer representation of a three-dimensional object stored in a 3D printable object file comprising at least one script and a set of parameter values;
provide, by the first server, to a second user interacting with a display of a client computer in the distributed computer system, the presentation interface including a display interface configured to display an image relating to the computer representation of the three-dimensional object and a control interface configured to accept inputs capable of modifying the at least one script associated with the three-dimensional object and wherein the computer representation of the three-dimensional object stored in the 3D printable object file comprising the at least one script and the set of parameter values is not provided to the second user;

receive, at the first server, from the second user interacting with the presentation interface, a request for the image based on modifying the at least one script relating to the computer representation of the three-dimensional object, wherein the request includes an object identifier and at least one or more user inputs from the group comprising: parameter values, attributes, uniform resource identifiers, cache busting markers, material identifiers, and three-dimensional ray values, wherein the object identifier and the at least one or more user inputs are applied to the at least one script relating to the computer representation of the three-dimensional object;

request, from the second server in the distributed computer system, the image relating to the computer representation of the three-dimensional object, wherein the image is generated based on a modified at least one script relating to the computer representation of the three-dimensional object;

receive the image from the second server; and display, by the first server, the image within the presentation interface.

13. The system of claim 12, wherein the 3D printable object file is different from the image.

14. The system of claim 13, wherein the image comprises a rasterized two-dimensional file.

15. The system of claim 13, wherein the image comprises a static three-dimensional file.

16. The system of claim 12, wherein the client component is further configured to:

receive, at the first server, from the second user interacting with the control interface, instructions to modify the at least one script associated with the computer representation of the three-dimensional object;

request, from the second server, responsive to the instructions, an updated image relating to the computer representation of the three-dimensional object, wherein the updated image reflects a modified computer representation of the three-dimensional object responsive to the modified at least one script;

receive, from the second server, the updated image; and display, by the first server, within the presentation interface, the updated image.

17. The system of claim 12, wherein the client component is further configured to:

receive, at the first server, from the second user interacting with the control interface, instructions to modify the at least one script associated with the computer representation of the three-dimensional object;

identify on the first server, an updated image relating to the computer representation of the three-dimensional object, wherein the updated image reflects a modified computer representation of the three-dimensional object responsive to the modified at least one script; and display, by the first server, the updated image within the presentation interface.

18. The system of claim 12, wherein the client component is further configured to:

receive, from the second user, a request to render the computer representation of the three-dimensional object in a specific material;

request, from the second server, the image representing the rendering of the three-dimensional object in the specific material;

compute, by the second server, an appropriate geometry for constructing the three-dimensional object from the specific material;

render, by the second server, the image representing the rendering of the three dimensional object in the specific material; and display the image to the second user within the presentation interface.

19. The system of claim 18, wherein the client component is further configured to:

receive, from the second user, a request to download a file containing an electronic representation of the three-dimensional object;

generate the file from the at least one script and the set of parameter values, wherein the file is a single computer file that is distinct from the at least one script and the set of parameter values; and present the file to the second user within the presentation interface.

20. The system of claim 19, wherein the file includes an electronic file format selected from the group comprising: STL and X3D.

21. The system of claim 18, wherein the client component is further configured to:

calculate a price for printing the three-dimensional object in the specific material; and present the price to the second user within the presentation interface.

22. The system of claim 21, wherein the client component is further configured to:

select one or more printers for the three dimensional object;

present the one or more printers to the second user;

receive an input from the second user selecting a printer from the one or more printers;

generate a file containing an electronic representation of the three-dimensional object; and send the file to the printer.

* * * * *